US012667513B2

(12) United States Patent
Liu et al.

(10) Patent No.: US 12,667,513 B2
(45) Date of Patent: Jun. 30, 2026

(54) SYSTEMS AND METHODS FOR RENDERING SIMULATED ENVIRONMENTS TO PROVIDE SEXUAL STIMULATION

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/825,346

(22) Filed: Sep. 5, 2024

(65) Prior Publication Data

US 2025/0139842 A1 May 1, 2025

Related U.S. Application Data

(60) Provisional application No. 63/594,930, filed on Oct. 31, 2023.

(51) Int. Cl.
| | |
|---|---|
| *G06T 11/00* | (2026.01) |
| *A61H 19/00* | (2006.01) |
| *G06F 3/01* | (2006.01) |
| *H04N 21/2187* | (2011.01) |

(52) U.S. Cl.
CPC .............. *A61H 19/00* (2013.01); *G06F 3/011* (2013.01); *G06T 11/00* (2013.01); *H04N 21/2187* (2013.01); *A61H 19/32* (2013.01); *A61H 2201/503* (2013.01); *A61H 2201/5043* (2013.01)

(58) Field of Classification Search
CPC .......... G06T 11/00; G06F 3/011; A61H 19/32
See application file for complete search history.

(56) References Cited

U.S. PATENT DOCUMENTS

| | | | |
|---|---|---|---|
| 10,088,895 B2 | 10/2018 | Baker et al. | |
| 10,685,488 B1 * | 6/2020 | Kumar | A61H 23/04 |
| 11,334,165 B1 * | 5/2022 | Clements | B66B 1/468 |
| 2014/0002493 A1 * | 1/2014 | Mitchell | A63F 13/00 |
| | | | 345/633 |
| 2015/0328082 A1 * | 11/2015 | Jiang | A61H 23/02 |
| | | | 600/38 |
| 2018/0147110 A1 * | 5/2018 | Cakmak | A61H 19/00 |
| 2018/0373324 A1 * | 12/2018 | Baker | A63F 13/352 |
| 2021/0134066 A1 * | 5/2021 | Koidahl | G06V 20/20 |

(Continued)

FOREIGN PATENT DOCUMENTS

WO    WO-2017189017 A1 * 11/2017 ............. A61H 19/00

*Primary Examiner* — Yu Chen
(74) *Attorney, Agent, or Firm* — Holtz, Holtz & Volek PC

(57) ABSTRACT

The present invention relates to systems and methods for rendering simulated environments to provide sexual stimulation. The method performed by a processor includes identifying an entity based on monitoring preset information. The preset information defined for identifying the entity include information associated with a model user and objects rendered in a field of view of a user of a plurality of users by a head-mounted display associated with the user, information related to other users of the plurality of users communicated with the user in real-time, and information related to the user. The method further includes determining at least one target element based on the identified entity. The method includes rendering the at least one target element in the field of view of the user by the head-mounted display. The at least one target element is configured to perform predefined actions corresponding to the entity.

18 Claims, 15 Drawing Sheets

(56)  References Cited

U.S. PATENT DOCUMENTS

| | | | | |
|---|---|---|---|---|
| 2022/0139168 | A1* | 5/2022 | He | H04L 51/046 |
| | | | | 463/16 |
| 2022/0156999 | A1* | 5/2022 | Assouline | G06F 3/04817 |
| 2023/0215121 | A1* | 7/2023 | Park | G06V 10/235 |
| | | | | 345/420 |
| 2025/0000741 | A1* | 1/2025 | Cambridge | A61H 19/44 |

* cited by examiner

Figure 13:
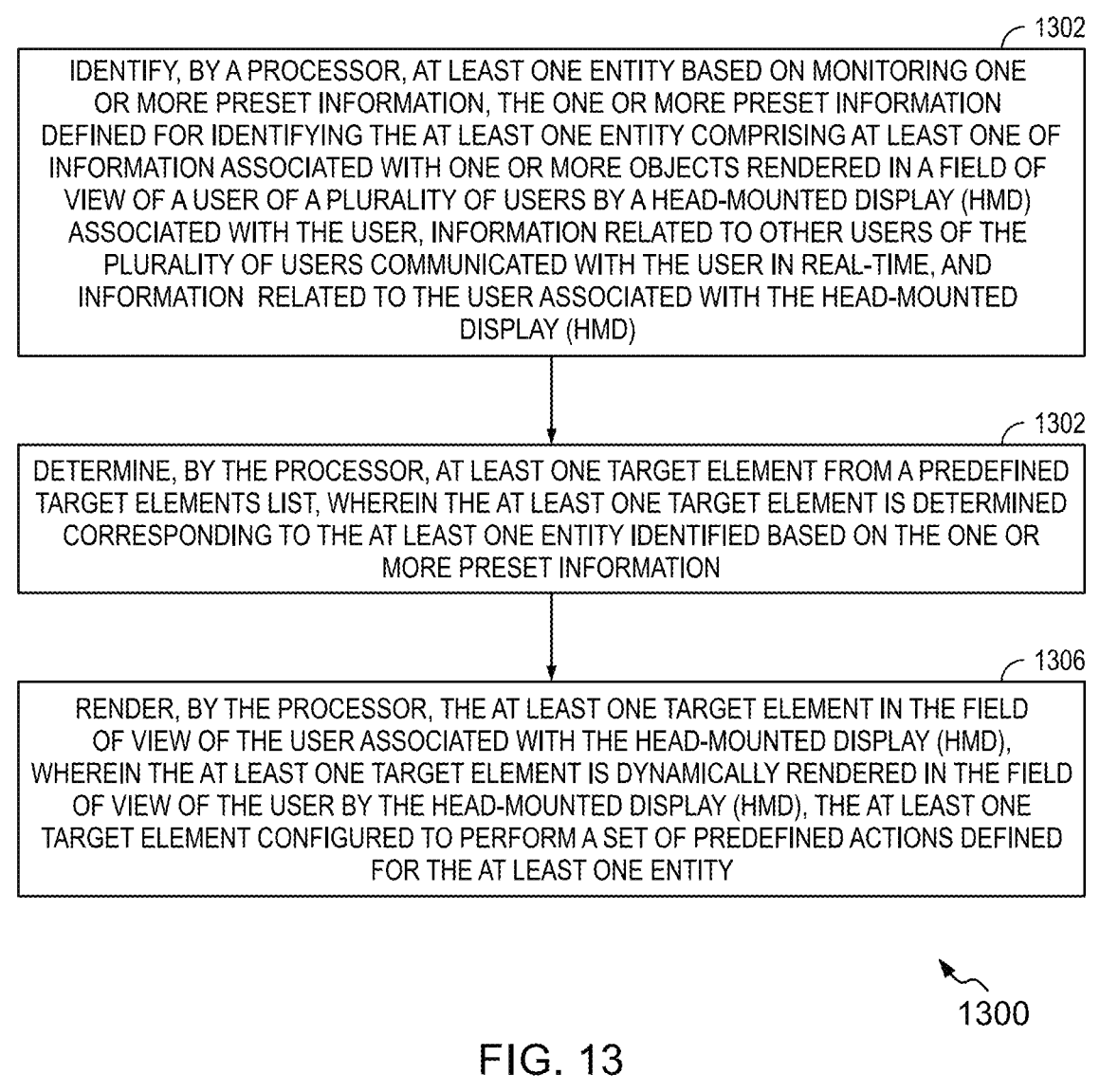

1302

IDENTIFY, BY A PROCESSOR, AT LEAST ONE ENTITY BASED ON MONITORING ONE OR MORE PRESET INFORMATION, THE ONE OR MORE PRESET INFORMATION DEFINED FOR IDENTIFYING THE AT LEAST ONE ENTITY COMPRISING AT LEAST ONE OF INFORMATION ASSOCIATED WITH ONE OR MORE OBJECTS RENDERED IN A FIELD OF VIEW OF A USER OF A PLURALITY OF USERS BY A HEAD-MOUNTED DISPLAY (HMD) ASSOCIATED WITH THE USER, INFORMATION RELATED TO OTHER USERS OF THE PLURALITY OF USERS COMMUNICATED WITH THE USER IN REAL-TIME, AND INFORMATION  RELATED TO THE USER ASSOCIATED WITH THE HEAD-MOUNTED DISPLAY (HMD)

1302

DETERMINE, BY THE PROCESSOR, AT LEAST ONE TARGET ELEMENT FROM A PREDEFINED TARGET ELEMENTS LIST, WHEREIN THE AT LEAST ONE TARGET ELEMENT IS DETERMINED CORRESPONDING TO THE AT LEAST ONE ENTITY IDENTIFIED BASED ON THE ONE OR MORE PRESET INFORMATION

1306

RENDER, BY THE PROCESSOR, THE AT LEAST ONE TARGET ELEMENT IN THE FIELD OF VIEW OF THE USER ASSOCIATED WITH THE HEAD-MOUNTED DISPLAY (HMD), WHEREIN THE AT LEAST ONE TARGET ELEMENT IS DYNAMICALLY RENDERED IN THE FIELD OF VIEW OF THE USER BY THE HEAD-MOUNTED DISPLAY (HMD), THE AT LEAST ONE TARGET ELEMENT CONFIGURED TO PERFORM A SET OF PREDEFINED ACTIONS DEFINED FOR THE AT LEAST ONE ENTITY

SYSTEMS AND METHODS FOR RENDERING SIMULATED ENVIRONMENTS TO PROVIDE SEXUAL STIMULATION

TECHNICAL FIELD

The present invention relates to electronic-based adult entertainment systems and methods, and more particularly relates to systems and methods for rendering mixed reality (MR) simulated environments to provide enhanced sexual stimulation to users.

BACKGROUND

Sexual stimulation can be achieved by an individual or a group of individuals (irrespective of gender) by using various means. Conventionally, self-operated sex toys are used by an individual for experiencing sexual stimulation. However, the individual may not always feel the same level of sexual stimulation at every instance using conventional sex toys as they have limited operating functionality.

Currently, social media and the ability to extend wireless interfaces, local and wide area networking, etc., have contributed to new methods and systems for experiencing sexual stimulation. In one example scenario, the individual may be allowed to experience enhanced sexual stimulation while viewing the sexual content. Additionally, the sex toys are operated to mimic the actions performed in the sexual content. However, in most cases, the sex toys may not be synchronized with the sexual content, thus resulting in an unsatisfied sexual experience while operating the sex toys. In another example scenario, live broadcasts featuring sexual content within the adult entertainment industry are increasing. These live broadcasts have experienced substantial growth over the years. For instance, models engaging in sexual acts, with or without the use of adult toys, are streamed in such live broadcasts. The current method of controlling the sex toy during the live broadcast is primarily reliant on various factors, leading to relatively simple interactions. Consequently, users may fail to provide intense sexual pleasure to viewers as per their individual preferences.

Therefore, there is a need for systems and methods for providing adult entertainment to users that overcome the aforementioned deficiencies along with providing other advantages.

SUMMARY

Various embodiments of the present disclosure disclose systems and methods for rendering mixed reality (MR) simulated environments to provide enhanced sexual stimulation to users.

In an embodiment, a computer-implemented method is disclosed. The computer-implemented method performed by a processor includes identifying at least one entity based on monitoring one or more preset information. The one or more preset information defined for identifying the at least one entity include at least one of information associated with one or more objects rendered in a field of view of a user of a plurality of users by a head-mounted display (HMD) associated with the user, information related to other users of the plurality of users communicated with the user in real-time, and information related to the user associated with the head-mounted display (HMD). The method further includes determining at least one target element corresponding to the at least one entity identified based on the one or more preset information. The method includes rendering the at least one target element in the field of view of the user associated with the head-mounted display (HMD). The at least one target element is dynamically rendered in the field of view of the user by the head-mounted display (HMD). The at least one target element is configured to perform a set of predefined actions corresponding to the at least one entity.

In another embodiment, a system is disclosed. The server includes a communication interface, a memory configured to store instructions, and a processor communicably coupled to the communication interface and the memory. The processor is configured to execute the instructions stored in the memory and thereby cause the system to at least identify at least one entity based on monitoring one or more preset information. The one or more preset information defined for identifying the at least one entity include at least one of information associated with one or more objects rendered in a field of view of a user of a plurality of users by a head-mounted display (HMD) associated with the user, information related to other users of the plurality of users communicated with the user in real-time, information related to the user associated with the head-mounted display (HMD). The system is further caused to determine at least one target element corresponding to the at least one entity identified based on the one or more preset information. The system is caused to render the at least one target element in the field of view of the user associated with the head-mounted display (HMD). The at least one target element is dynamically rendered in the field of view of the user by the head-mounted display (HMD). The at least one target element is configured to perform a set of predefined actions corresponding to the at least one entity.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers:

FIG. 13 illustrates a flow diagram of a computer-implemented method for rendering the simulated environments to provide enhanced sexual experience, in accordance with an embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present invention are described hereinafter with reference to FIG. 1 to FIG. 14.

Figure 1:
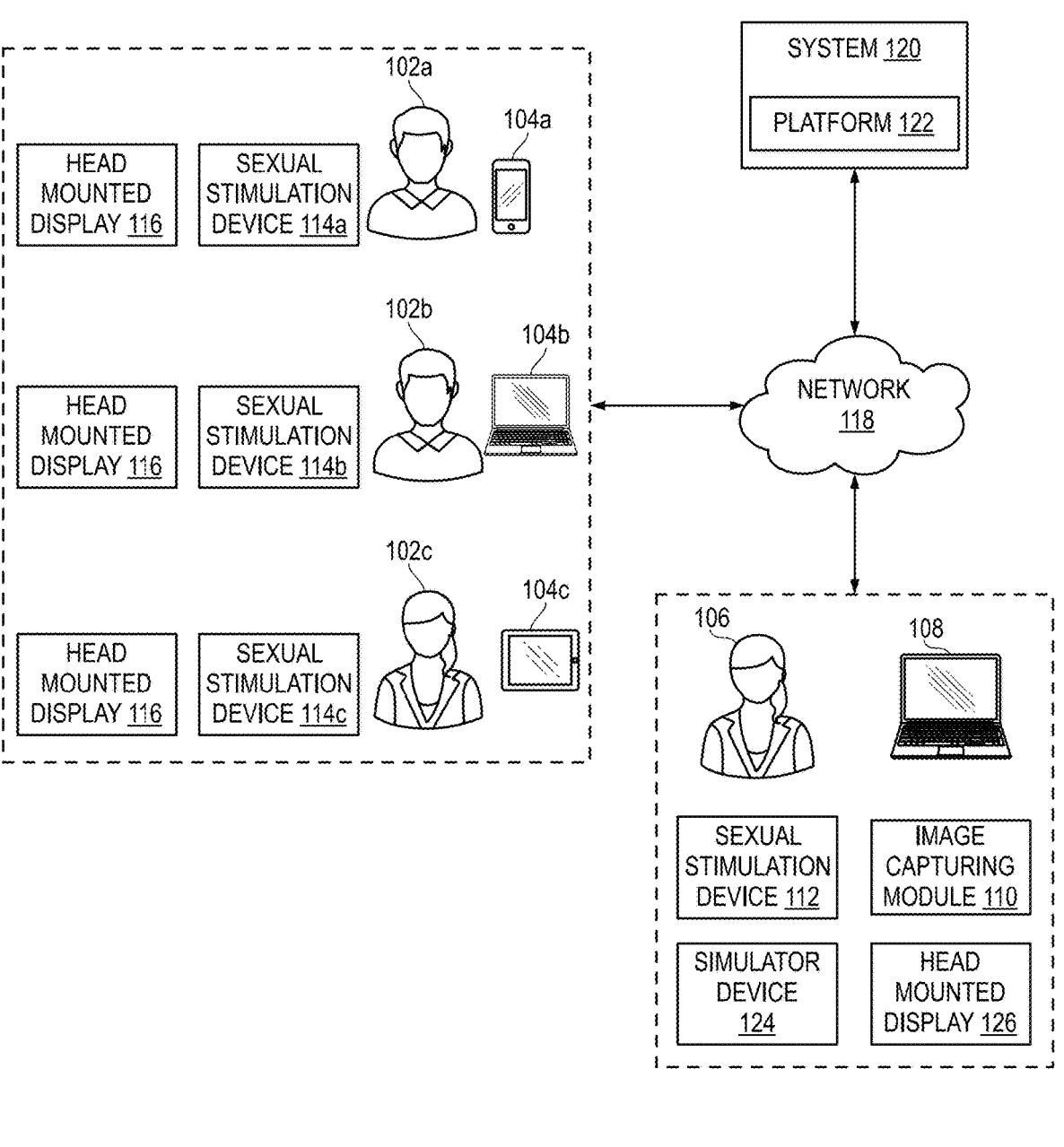
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of users (collectively referring to a user 102a, a user 102b, and a user 102c). Each of the users 102a, 102b, and 102c is respectively associated with a user device 104a, a user device 104b, and a user device 104c. The user devices 104a-104c may include at least a laptop computer, a phablet computer, a handheld personal computer, a virtual reality (VR) device, a netbook, a Web book, a tablet computing device, a smartphone, or other mobile computing devices. Further, the environment 100 includes a model user 106. In an embodiment, the model user 106 may be a model performing content (e.g., sexual content). For illustration purposes, only one model user is depicted, and there can be any number of model users. Furthermore, the model user 106 is associated with a user device 108 (exemplarily depicted to be a laptop computer) and an image capturing module 110. The image capturing module 110 may be connected to the user device 108 using wired/wireless communication. Some examples of wireless communication may include Bluetooth, near-field communication (NFC), wireless fidelity (Wi-Fi), and the like. In one scenario, the model user 106 may utilize the image capturing module 110 to capture the sexual content. In another scenario, the model user 106 may utilize an image capturing module associated with the user device 108 for capturing the model user 106 performing the sexual content.

Furthermore, the users 102a-102c are associated with a sexual stimulation device 114a, a sexual stimulation device 114b, and a sexual stimulation device 114c, respectively, and the model user 106 is associated with a sexual stimulation device 112. It is to be noted that the sexual stimulation devices 114a-114c and 112 are selected based on the gender of the users 102a-102c and the creator 106. For instance, the sexual stimulation devices 114a and 114b are male sex toys, and the sexual stimulation devices 114c and 112 are female sex toys. Some examples of female sex toys may include, but are not limited to, a dildo, a vibrator, and the like. Examples of male sex toys may include masturbators. The sexual stimulation devices 114a-114c and 112 may be connected wirelessly with the respective user devices 104a-

104c and 108. Some examples of the wireless connectivity for enabling connection between the sexual stimulation devices 114a-114c and 112 and the user devices 104a-104c and the user device 108 may be, but not limited to, near field communication (NFC), wireless fidelity (Wi-Fi), Bluetooth, and the like.

In addition, each of the users 102a-102c and the model user 106 are associated with a head-mounted display 116 and a head-mounted display 126, respectively. The head-mounted displays 116 and 126 may be connected to their respective user devices (e.g., the user devices 104a-104c and the user device 108) using at least wired or wireless communication protocols. Some examples of the wireless communication protocols may include Near Field Communication (NFC) protocol, wireless fidelity (Wi-Fi), etc. The head-mounted displays 116 and 126 are examples of mixed-reality (MR) headsets. The head-mounted displays 116 and 126 are configured to implement spatial computing for rendering simulated environments. In general, mixed reality (MR) is a blend of physical and digital worlds, unlocking natural and intuitive 3D human, computer, and environmental interactions. In other words, mixed reality (MR) relates to a view of the real world—the physical world—with an overlay of digital elements where physical and digital elements can interact.

Various entities in the environment 100 may connect to a network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 118 may include a secure protocol (e.g., Hypertext Transfer Protocol (HTTP)), and/or any other protocol, or set of protocols. In an example embodiment, the network 118 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes a system 120. The system 120 is configured to host and manage a platform 122 and continuously monitor the simulated environments of the head-mounted displays 116 and 126 for providing enhanced sexual stimulation. The system 120 may be embodied in at least one computing device in communication with the network 118. In an embodiment, the system 120 may be embodied in the user devices 104a-104c. In another embodiment, the system 120 may be embodied in the head-mounted displays 116 and 126. The system 120 may be specifically configured, via executable instructions to perform one or more of the operations described herein. In general, the system 120 is configured to provide adult entertainment which will be explained further in detail.

Further, the platform 122 is a set of computer-executable codes configured to allow the model user 106 to create the live broadcast for the users 102a-102c. In one embodiment, the platform 122 may be accessed as a web-based application on the user devices 102a-102c and 108. In another embodiment, the user devices 104a-104c and 108 may access an instance of the platform 122 from the system 120 for installing on the user devices 104a-104c and 108 using application stores associated with operating systems such as Apple IOS®, Android™ OS, Google Chrome OS, Symbian OS®, Windows Mobile® OS, and the like.

In one embodiment, the system 120 is configured to identify at least one entity based on monitoring one or more preset information. The one or more preset information defined for identifying the at least one entity may include at least information associated with the model user 106 and one or more objects rendered in a field of view of the user (e.g., the user 102a) by the head-mounted display (HMD) 116 associated with the user 102a, information related to other users (e.g., the users 102b-102c), information related to the user 102a, one or more preset parameters and a scene information. For description purposes, the present disclosure is explained with reference to the user 102a. Further, it should be understood by a person skilled in the art that the operations performed by the user 102a can also be performed by the users 102b and 102c.

In particular, the head-mounted display 116 may be worn by the user 102a to experience enhanced sexual stimulation. As explained above, the head-mounted display 116 may provide immersive experiences to the user 102a in a field of view of the user 102a. In other words, the head-mounted display 116 is configured to capture the environment and user movements of the user 102a in the field of view of the user 102a and renders the captured environment to the user 102a. Further, the head-mounted display 116 is communicably coupled to the user device 104a and is configured to access the platform 122 equipped in the user device 108. As such, the system 120 may continuously track the environment rendered by the head-mounted display 116 to the user 102a in the field of view of the user 102a.

The system 120 is configured to identify the entities in the field of view of the user 102a based on the preset information. In other words, the system 120 identifies the entities in the field of view of the user 102a based on determining if the entities match the preset information. Further, the system 120 determines at least one target element from a predefined target elements list. The predefined target elements list may be stored in a database associated with the system 120. The at least one target element is determined corresponding to the at least one entity identified based on the one or more preset information. Further, the at least the entity and the at least one target element are related to sexual entertainment. For example, the at least one target element includes at least virtual characters, virtual properties, and a visual effect. Thereafter, the system 120 renders the at least one target element in the field of view of the user 102a through the head-mounted display 116. The at least one target element is dynamically rendered in the field of view of the user 102a by the head-mounted display 116. The at least one target element is configured to perform a set of predefined actions defined for the at least one entity which will be explained further in detail.

In an embodiment, the system 120 is configured to control the sexual stimulation device 112 of the model user 106. In other words, the model user 106 may access the platform 122 using the user device 108. Further, the model user 106 uses the sexual stimulation device 112 to create the pornographic live broadcast and streams the live broadcast via the interactive platform 122. The live broadcast streamed by the model user 106 may be a one-to-one private live broadcast, or a public live broadcast, where multiple users are allowed to view and interact in the live broadcast of the model user 106. Further, the users 102a-102c are referred to as the viewers of the live broadcast. The users 102a-102c access the interactive platform 122 on their respective user devices 104a-104c to view the live broadcast of the model user 106. As explained above, the users 102a-102c may connect the head-mounted display 116 to their respective user devices 104a-104c, thus allowing the users 102a-102c to access the contents of the user devices 104a-104c on the head-mounted display 116. The head-mounted display 116 implements a spatial computing technique to render a mixed reality (MR) environment of the content associated with the user devices 104a-104c.

The user 102a uses the head-mounted display 116 to view the live broadcast of the model user 106. In an embodiment, the live broadcast of the model user 106 may be one-to-one live broadcast i.e., between the user 102a and the model user 106. The user 102a interacts with the live broadcast by providing at least one interaction input that are tracked by the head-mounted display 116. In an embodiment, the user 102a may be allowed to interact with the live broadcast when the user 102a completes a preset task associated with the live broadcast. The preset task may be providing tokens holding at least a threshold value to the model user 106 in the live broadcast. For example, the threshold value may be 15 tokens, thus the user 102a is required to provide at least 15 tokens in the live broadcast of the model user 106 to complete the preset task. The tokens may hold monetary value in the interactive platform 122. In another embodiment, the user 102a may be allowed to provide the interaction inputs in the live broadcast without completing the preset task.

It is to be noted that the spatial computing technique associated with the head-mounted display 116 allows the user 102a to provide the at least one interaction input, thereby allowing interaction with the entities rendered in the field of view of the user 102a. For example, the user 102a may access the live broadcast from the platform 122 using the head-mounted display 116. In this scenario, the head-mounted display 116 is configured to track the at least one interaction input (hereinafter interchangeably referred to as the interaction inputs) of the user 102a and create input data including the interaction inputs. The interaction inputs may include at least a movement of palm, hand gestures, eye movements, and genital movements of the user 102a. The interaction inputs in the input data are accessed by the system 120. In this scenario, the system 120 is configured to analyze the interaction inputs determined by the head-mounted display 116. For example, the user 102a may move the palm from left to right side. The system 120 identifies one or more parameters based on the interaction inputs captured from the head-mounted display 116. The parameters may include displacement of the palm, speed of the movement, frequency, etc. Additionally, other types of parameters such as the parameters displacement of the eye of genital, speed of the movement, frequency, etc., may be tracked by the head-mounted display 116.

The system 120 identifies the parameters of the input data and generates a control instruction corresponding to the interaction inputs of the user 102a. The control instruction controls at least the sexual stimulation device 112 of the model user 106, the sexual stimulation device 114a of the user 102a, and the target elements. Thus, it is evident that the sexual stimulation device 112 proportionally reproduces (or mimics) the interaction inputs of the user 102a. For example, the control instruction is configured to operate the sexual stimulation device 112 to mimic the intercourse or penetration action corresponding to the interaction inputs. In this example scenario, the control instruction is generated to adjust settings related to a reciprocating frequency, stroke length, etc., of the sexual stimulation device 112.

In another scenario, the user 102a may use the sexual stimulation device 114a to provide the interaction inputs. In this scenario, the head-mounted display 116 associated with the user 102a captures the movements of the sexual stimulation device 114a. In another scenario, the user 102a may use his/her genitals to provide the interaction inputs. The user 102a wearing the head-mounted display 116 captures the actions of the genitals (e.g., masturbation action of the penis) while the live broadcast is simultaneously rendered in the head-mounted display 116. As a result, the system 120 may operate the head-mounted display 116 corresponding to the above interaction inputs of the user 102a.

In another scenario, the sexual stimulation device 112 of the model user 106 may be a fingering toy. In this scenario, the user 102a may capture a flicking gesture (i.e., the interaction inputs) using the head-mounted display 116. As a result, the speed of the flicking output of the flicking toy (i.e., the sexual stimulation device 112) may be adjusted based on the speed of the flicking gesture.

In another scenario, the user 102a may provide the interaction inputs based on the eye movement of the user 102a. The head-mounted display 116 captures the eye twitches, pupil dilation, etc., and creates the corresponding input data. It is to be noted that the system 120 is configured to identify the corresponding parameters from the input data received from the head-mounted display 116 of the user 102a. Accordingly, the system 120 generates the control instruction.

In an embodiment, the model user 106 may include a simulator device 124. The head-mounted display 116 may transmit the input data corresponding to the predefined actions (e.g., hand gestures of the user 102a). Thus, the system 120 generates the control instruction corresponding to the input data (e.g., hand gestures of the user 102a). The control instruction operates the simulator device 124 to perform the hand gestures of the user 102a. For example, the simulator device 124 may be a hand-shaped toy that can simulate human hand movements. In this scenario, the control instruction operates the hand-shaped toy through hand gestures to perform touch, grasp, insert action, and the like.

In one embodiment, the live broadcast of the model user 106 may be available to multiple users (e.g., the users 102a-102c). In this scenario, each of the users 102a-102c is allowed to interact in the live broadcast of the model user 106 by providing the interaction inputs. The head-mounted display 116 associated with each of the users 102a-102c creates the input data corresponding to the interaction inputs of the users 102a-102c. It is to be noted that the sexual stimulation device 112 of the model user 106 is operated on a priority basis in case of the live broadcast being streamed to the users 102a-102c. For example, the interaction inputs provided by the user 102a and the user 102c may be tracked by their respective head-mounted display 116. The head-mounted display 116 of the respective users 102a and 102c creates the input data and transmits the input data to the system 120. The system 120 creates the control instruction for the input data of the users 102a and 102c for controlling the sexual stimulation device 112 based on a priority basis. The priority basis is determined based on the time of receipt of the input data from the head-mounted display 116. In one example, the input data of the user 102a is received in the first instance and the input data of the user 102c is received later. In this case, the system 120 operates the sexual stimulation device 112 corresponding to the input data of the user 102a, and the input data of the user 102c is queued up in a list. In case, the time of receipt of the input data from two users (e.g., the users 102a and 102c) is determined to be the same, the system 120 automatically prioritizes the input data and selects one input data among queues of the other input data in the list. It is to be understood that the sexual stimulation device 112 of the model user 106 is controlled based on the input data of one user at a time.

In an embodiment, the system 120 is configured to detect the body part of a user (e.g., the user 102c) as the at least one entity. Thereafter, the system 120 monitors the body part of the user 102c to detect if the body part of the user 102c performs the set of predefined actions. For example, the body part of the user 102c may be 'chest' and the set of predefined actions performed by the user 102c on the body part may be 'squeezing of the chest'. In this scenario, the system 120 renders a virtual object corresponding to identification of the body part of the user 102c. The virtual object may be referred to as the virtual character. The virtual object may be virtual tokens. Further, the system 120 is configured to render an instruction for providing the tokens corresponding to the set of predefined actions of the body part (e.g., squeezing the chest). The instruction for providing the tokens may allow the user 102c to provide the tokens to other users (such as the user 102a, the user 102b, and the model user 106).

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2:
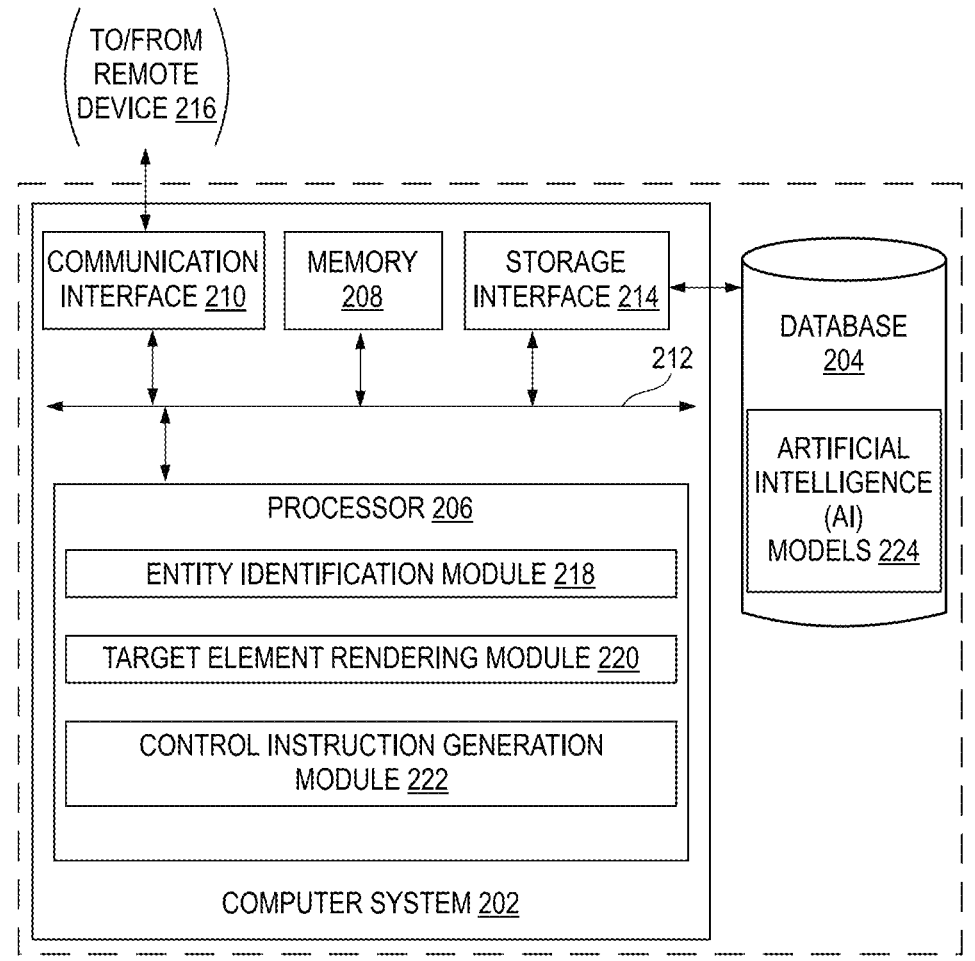
FIG. 2 illustrates a simplified block diagram of a system for rendering a simulated environment to provide enhanced sexual experience, in accordance with an embodiment of the present disclosure.

FIG. 2 illustrates a simplified block diagram of a system 200, in accordance with an embodiment of the present disclosure. Examples of the system 200 may include, but are not limited to, the system 120 as shown in FIG. 1. The system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the application 106 and one or more components of the application 106. The one or more components of the application 106 may include, but not limited to, data including personal data, confidential and sensitive information, privacy details, and the like. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the system 200, as described herein. In some embodiments, the memory 208 may be realized in the form of a database or cloud storage working in conjunction with the system 200, without deviating from the scope of the present disclosure.

The processor 206 is operatively coupled to the communication interface 210 such that the processor 206 is capable of communicating with a remote device 216 such as the user devices 104a-104b, the user device 108, the head-mounted displays 116 and 126, or with any entity connected to the network 118 as shown in FIG. 1.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the processor 206 includes an entity identification module 218, a target element rendering module 220, and a control instruction generation module 222. As such, the one or more components of the processor 206 as described above are communicably coupled with the application 106.

The entity identification module 218 includes suitable logic and/or interfaces to identify the at least one entity based on monitoring the preset information. The preset information defined for identifying the at least one entity may include information associated with the model user 106 and one or more objects rendered in the field of view of the user (e.g., the user 102a) by the head-mounted display (HMD) 116 associated with the user 102a, the information related to the other users (e.g., the users 102b-102c), the information related to the user 102a. In other words, the entity identification module 218 identifies the entities in the field of view of the user 102a based on determining if the entities match the preset information. Some non-limiting examples of the entities include, but not limited to, a character of the content rendered by the head-mounted display (HMD) 116, the sexual stimulation device 11 of the model user, one or more objects rendered in the content, a sexual stimulation device of the user, a body part of the user, gestures performed by the user.

In one example, the environment rendered by the head-mounted display 116 in the field of view of the user 102a includes the model user 106 using the sexual stimulation device 112. The platform 122 may be accessed using the head-mounted display 116 to render the content including the model user 106 using the sexual stimulation device 112. As a result, the entity identification module 218 identifies the sexual stimulation device 112 as the entity. It is to be noted that the sexual stimulation device 112 of the model user 106 corresponds to the information associated with the model user 106 as defined in the preset information. In another example, the environment rendered by the head-mounted display 116 in the field of view of the user 102a includes the sexual stimulation device 114a of the user 102a. In this scenario, the system 120 identifies the sexual stimulation device 114a as the entity. It is to be noted that the sexual stimulation device 112 of the model user 106 corresponds to the information associated with the user 102a as defined in the preset information. In another example, the environment rendered by the head-mounted display 116 in the field of view may include an object (e.g., sofa, chair, book, etc.) rendered in the content. In this example, the entity identification module 218 may determine the object as the entity.

The target element rendering module 220 includes suitable logic and/or interfaces to determine the at least one target element from the predefined target elements list. The predefined target elements list may be stored in the database 204 associated with the system 200. The at least one target element is determined corresponding to the at least one entity identified based on the one or more preset information. For example, the at least one target element includes at least the virtual characters, virtual properties, and a visual effect. Further, the target element rendering module 220 dynamically renders the at least one target element (e.g., the virtual character or the virtual object) in the field of view of the user 102a by the head-mounted display 116.

In an embodiment, the entity identification module 218 may identify a first entity among the at least one entity in the field view based on the one or more preset information. The target element rendering module 220 determines the at least one target element corresponding to the first entity. The first entity may be the sexual stimulation device 114a and/or the sexual stimulation device 112. In this scenario, the target element rendering module 220 facilitates the head-mounted display (HMD) to render the at least one target element by superimposing the at least one target element on the first entity of the at least one entity in the field of view of the user 102a. The at least one target element is superimposed on the first entity in the field of view based on determining a location coordinate of the first entity in the field of view of the user being rendered by the head-mounted display (HMD).

In one example, the entity (i.e., the first entity) identified by the entity identification module 218 is the sexual stimulation device 112 of the model user 106 performing in the content rendered by the platform 122. In this example, the target element rendering module 220 determines the target element to be the virtual character (e.g., a 3-dimensional (3D) virtual character). Thereafter, the target element rendering module 220 renders the virtual character in the field of view by superimposing the virtual character on the sexual stimulation device 112. In other words, the target element rendering module 220 replaces (or materializes) the sexual stimulation device 112 with the virtual character. In an embodiment, the virtual character may be the 3D character of the user 102a. The processor 206 may receive the information of the user 102a such as the morphological data of the user 102a. In one scenario, the morphological data may be captured using the head-mounted display 116. In another scenario, the user 102a may use the user device 104a to capture the morphological data of the user 102a. Further, the processor 206 generates the target element (i.e., the virtual character of the user 102a) corresponding to the information of the user 102a based at least on one or more artificial intelligence (AI) models 224. The AI models 224 may be stored in the database 204. For example, the AI models 224 include generative AI models.

In another example, the entity is determined to be the sexual stimulation device 114a of the user 102a. In this scenario, the target element rendering module 220 renders the virtual character as the target element in the field of view of the user 102a by the head-mounted display 116. In other words, the sexual stimulation device 112 is materialized into the 3D character and rendered by the head-mounted display 116 in the field of view of the user 102a.

In another example, the sexual stimulation device 114a or the sexual stimulation device 112 may be replaced with the body part of the virtual character (i.e., the target element). For instance, if the sexual stimulation device 112 is a vibrator inserted into the model's (i.e., the model user 106) vagina, the body part (fingers) of the virtual character may be rendered at the vagina of the model user 106 in place of the vibrator. In some embodiments, the body part of the model user 106 in the field of view may be rendered as another body part.

In one embodiment, the entity identification module 218 may identify a second entity of the at least one entity in the field of view of the user 102a based on the one or more preset information. In this scenario, the target element rendering module 220 determines the at least one target element corresponding to the second entity. Further, the target element rendering module 220 facilitates the head-mounted display 116 to render the at least one target element along with the second entity in the field of view of the user 102a. In one example, the user 102a may watch the content (e.g., pornographic live broadcast) rendered in the platform 122 using the head-mounted display 116. In this scenario, the entity identification module 218 identifies the model user 106 in the content as the second entity. The target element rendering module 220 allows the user 102a to provide tokens as the target elements in the content, thereby rendering the target element along with the second entity to the user 102a. In another example, the target element rendering module 220 may render the visual effect as the target element in response to the detection of the second entity. In this scenario, the second entity is determined based on providing the tokens (equivalent to the threshold value) in the content rendered by the platform 122. Further, the target element rendering module 220 renders the visual effect as the target element in the field of view of the user 102a.

The control instruction generation module 222 includes suitable logic and/or interfaces to generate the control instruction corresponding to the at least one interaction input. The control instruction is configured to at least control the at least one target element, the sexual stimulation device 112 of the model user 106 rendered in content, and the sexual stimulation device 114a of the user 102a.

As explained above, the system 200 (or the processor 206) is configured to continuously track the data being captured by the head-mounted display 116. The processor 206 is configured to detect the at least one interaction input provided by the user 102a to interact with the at least one entity and the at least one target element rendered in the field of view of the user 102a by the head-mounted display 116. For example, the visual effect such as a whip is rendered as the target element. In this scenario, the processor 206 in conjunction with the head-mounted display 116 detects the interaction inputs provided by the user 102a related to waving the whip. In this scenario, the control instruction generation module 222 generates the control instruction to control the target element corresponding to the interaction inputs. The target element rendering module 220 operates the whip to swing based on the interaction inputs provided by the user 102a in response to the receipt of the control instruction. Specifically, the head-mounted display 116 may track motion metrics for detecting the movement of the hand of the user 102a. The motion metrics correspond to the interaction inputs. Hence, the control instruction generation module 220 generates the control instruction corresponding to the motion metrics. Further, the target element rendering module 220 operates the whip to swing upon receipt of the control instruction from the control instruction generation module 222.

In another example, the virtual character may be rendered as the target element based on detecting the entity (e.g., the sexual stimulation device 114a). In another example, the virtual character may be rendered as the target element based on detecting the body part (e.g., penis) of the user (e.g., the user 102a) as the at least one entity. In both the scenarios, the head-mounted display 116 may track the movement of the sexual stimulation device 116 (i.e., the entity) of the user 102a or the body part of the user 102a while the head-mounted display 116 renders the content performed by the model user 106. The movement of the sexual stimulation device 116 or the body part of the user 102a corresponds to the interaction inputs of the user 102a. In particular, the head-mounted display 116 may track one or more parameters related to motion information of the entity (i.e., the sexual stimulation device 114a) and transmit the motion information to the system 200. The control instruction generation module 220 generates the control instruction corresponding to the motion information indicating the movement of the sexual stimulation device 114a or the body part of the user 102a. Further, the target element rendering module 220 facilitates the virtual character or the virtual object to perform a set of predefined actions corresponding to the movement of the sexual stimulation device 116 upon receipt of the control instruction. For instance, the sexual stimulation device 114a may be a male masturbating device. In this example scenario, the movement (e.g., reciprocatory motion) of the male masturbating device may enable the virtual character to perform penetration action on the model user 106. The penetration action corresponds to the set of predefined actions defined for the movement of the sexual stimulation device 114a (i.e., the entity). Similarly, the target element rendering module 220 determines the virtual object (or the virtual character) as the at least one target element based on identifying the body part of the user as the at least one entity. Further, the virtual object is rendered in the field of view of the user 102a by the head-mounted display (HMD) 116 associated with the user 102a. In this scenario, the target element (i.e., the virtual object) to perform the set of predefined actions corresponding to the motion information of the body part of the user 102a. In an embodiment, the hand of the user 102a may be identified as the at least one entity. In this scenario, the hand movement of the character (or the user 102a) may be detected by the HMD 116. To that effect, the system 120 renders the virtual object (e.g., virtual token) as the at least one target element. It is to be noted that the virtual object (or the virtual tokens) may be thrown out corresponding to the hand movement of the user 102a. Further, tokens may be provided to a target user (e.g., the model user 106).

In another example, the entity is detected based on the interaction inputs provided by the user 102a related to touching the chest region of the model user 106 in the content. In this scenario, the control instruction generation module creates the control instruction corresponding to the interaction inputs related to the touching of the chest region. The target element rendering module 220 may cause the chest of the model user 102a to be rendered in a magnified view or cause the chest to shake (i.e., the set of predefined actions).

In another example, the user 102a may provide the interaction inputs to interact with the content rendered by the platform 122 in the field of view of the user 102a. The interaction inputs may include fingering action performed on the model user 106. In this scenario, the head-mounted display 116 tracks the fingering action performed on the model user 106 and transmits it to the system 200. The control instruction generation module 222 may generate the control instruction corresponding to the interaction inputs (e.g., the fingering action) for operating the sexual stimulation device 114a of the user 102a. The control instruction may include one or more operating parameters (e.g., operating time, frequency, intensity, etc.) defined based on the interaction inputs. The sexual stimulation device 114a is operated based on the one or more operating parameters of the control instruction.

In addition, the processor 206 is configured to identify the at least one entity rendered in content in the field of view of the user 102a by the head-mounted device 116. Further, the processor 206 may render the at least one entity of the content as the at least one target element in the field of view of the user 102a by the head-mounted device 116. The at least one entity is rendered as the at least one target element based at least on one or more image processing techniques. In one example, the content rendered by the platform 122 may be a live broadcast or a pornographic video of the model user 106. In this scenario, the entity identification module 218 may be configured to identify the model user 106 in the content as the entity. Specifically, the head-mounted display 116 may track the eye gaze of the user 102a. The entity identification module 218 may determine the model user 106 in the content as the entity if the user 102a is focusing the model user 106 for a threshold time. (i.e., the eye gaze of the user 102a is equivalent to the threshold time). The threshold time may be 10 seconds. In another example, the model user 106 may be predefined as the entity in the system 200. In another example, the user 102a may point the hand towards the model user 106 for more than or equal to the threshold time (10 seconds) for allowing the entity identification module 218 to determine the model user 106 as the entity. Thereafter, the target element rendering module 220 renders the entity as the target element to the user 102a. In particular, the target element rendering module 220 may apply one or more image processing techniques to remove the ambient environment of the model user 106 and extract the model user 106 of the content to render as the target element in the field of view of the user 102a.

In an embodiment, the user 102a may be rendered with multiple contents (e.g., pornographic multimedia and live broadcast) by the head-mounted display 116. For example, the head-mounted display 116 may render three contents in the field of view of the user 102a. Each content in the field of view of the user 102a may be performed by a same model user or different model users. In this scenario, the head-mounted display 116 allows the entity identification module 218 to determine the model user of each content rendered in the field of view of the user 102a as the entity. Thereafter, the target element rendering module 220 applies the image processing techniques to eliminate the ambient environment and extract the entities (i.e., the model users) of the three contents. The target element rendering module 220 renders the entities in the field of view of the user 102a, thereby allowing the user 102a to visualize different model users in the same environment at the same time.

Further, the processor 206 is configured to determine the scene information of the user 102a by the head-mounted display 116. Thereafter, the target element rendering module 220 determines the at least one target element from the predefined target elements list corresponding to the scene information. The at least one target element is rendered in the field of view of the user 102a by merging the at least one target element in the scene information rendered in the field of view of the user 102a. For example, the user 102a wearing the head-mounted display 116 may enter the kitchen. In this scenario, the processor 206 identifies the scene information as the kitchen. The target element rendering module 220 may determine the target element (e.g., the virtual character) from the predefined target elements list corresponding to the scene information (e.g., the kitchen). Further, the target element rendering module 220 renders the virtual character in the field of view of the user 102*a* by merging the virtual character in the scene information. This type of rendering of the target element in the scene information provides an augmented reality experience.

Additionally, the processor 206 is configured to receive one or more preset parameters such as activities of the user 102*a*, ambient conditions, and the like. The preset parameters such as the ambient condition (e.g., temperature, humidity, or weather condition) may be determined by sensors (not shown in FIGS.) equipped in the head-mounted display 116 or the user device 104*a*. Further, the activities of the user 102*a* may include providing a preset tokens. Further, the target element rendering module 220 renders the at least one target element corresponding to the one or more preset parameters in the field of view of the user 102*a* through the head-mounted display 116. In one example, the ambient temperature is lower than 16° C. The target element rendering module 220 renders the visual effect of snow (i.e., the target element) in the field of view of the user 102*a*. In another example, the wind speed of the environment is higher than a certain value. In this scenario, the target element rendering module 220 renders the visual effect of wind (i.e., the target element) in the field of view of the user 102*a*.

Furthermore, the processor 206 is configured to render the content in the field of view of the user 102*a* by the head-mounted display 116 based on the selection of a viewing mode by the user 102*a*. The user 102*a* may be provided with multiple viewing modes by the platform 122 to view the content. The user 102*a* may select one viewing mode among the multiple viewing modes to render the content in the field of view of the user 102*a*. In one embodiment, the user 102*a* uses the head-mounted display 112 and provides inputs to change the perspective of watching the performance of the model user 106 in the content. For example, the user 102*a* may select the viewing mode to watch the performance of multiple models at the same time from a giant/overlooking perspective, or watch the performance from a small/looking-up perspective, or watch the performance from a hole (similar to a voyeur) perspective.

Figure 3:
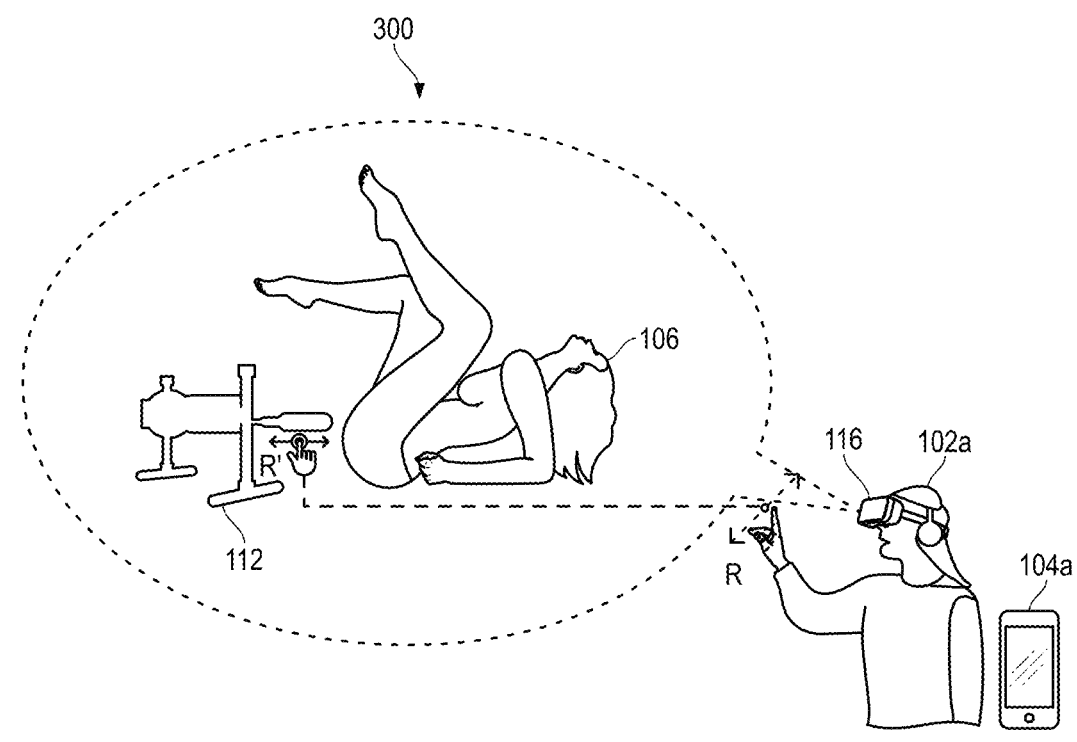
FIG. 3 illustrates an example scenario of a mixed reality (MR) environment rendered by a head-mounted display to a user for receiving interaction inputs from the user, in accordance with an embodiment of the present disclosure.

FIG. 3 illustrates an example scenario of a mixed reality (MR) environment 300 rendered by the head-mounted display 116 to the user 102*a* for receiving interaction inputs from the user 102*a*, in accordance with an embodiment of the present disclosure. As explained above, the head-mounted display 116 renders the live broadcast of the model user 106 (or the content) associated with the platform 122 in the mixed reality (MR) environment 300 based on the spatial computing technique. The model user 106 is associated with the sexual stimulation device 112 as shown in the MR environment 200. Further, the user 102*a* may provide the interaction inputs for interacting with the model user 106 (i.e., controlling the sexual stimulation device 112 of the model user 106).

As shown in FIG. 3, the user 102*a* provides the hand gestures as the interaction inputs. The hand gestures may include movement of the finger in a rectilinear path (i.e., from left to right). The head-mounted display 116 of the user 102*a* captures the hand gestures of the user 102*a*. It is to be noted that the hand gestures (exemplarily represented as 'R')

performed by the user 102*a*, in reality, are navigated on the MR environment 200 (exemplarily represented as a pointer R'). In this scenario, the sexual stimulation device 112 may be the target element and the user 102*a* performs the predefined actions for controlling the sexual stimulation device 112 of the model user 102. Further, the head-mounted display 116 may track the hand gestures such as speed of the finger movement, frequency, direction, and the like. The control instruction generation module 222 generates the control instruction corresponding to the interaction inputs for controlling the sexual stimulation device 112 to perform the set of predefined actions. In particular, the control instruction adjusts the settings related to a reciprocating frequency, stroke length, etc., of the sexual stimulation device 112 to provide sexual stimulation to the model user 106 in the live broadcast.

Figure 4A:
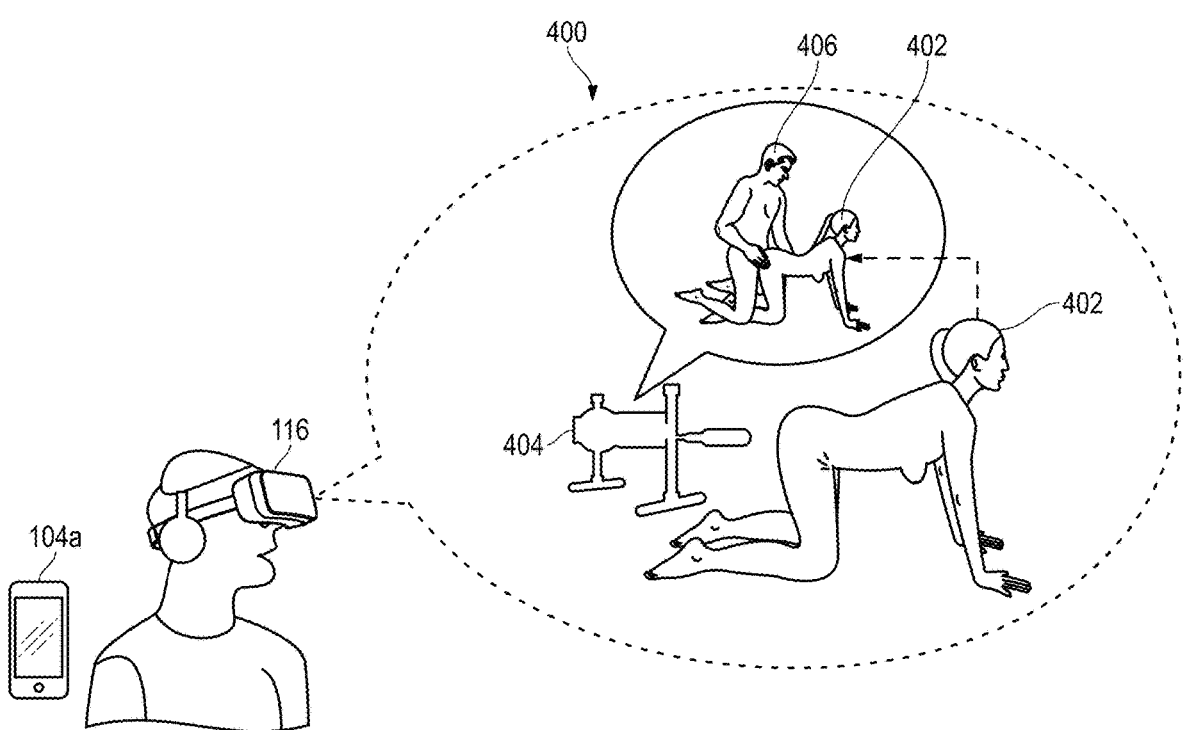
FIG. 4A illustrates an example scenario of an MR environment depicting replacing an identified entity with a target element, in accordance with an embodiment of the present disclosure.

FIG. 4A illustrates an example scenario of an MR environment 400 depicting replacing an identified entity with a target element, in accordance with an embodiment of the present disclosure. As shown, the user 102*a* uses the head-mounted display 116 for watching pornographic content or the live broadcast of a model user (see, 402). In this scenario, the entity identification module 218 may identify a sexual stimulation device (see, 404) as the at least one entity in the MR environment 400. As shown, the sexual stimulation device 404 is associated with the model user 402 rendered in the MR environment 400. The model user 402 and the sexual stimulation device 404 are examples of the model user 106 and the sexual stimulation device 112 of FIG. 1. Upon identification of the sexual stimulation device 404 as the at least one entity in the MR environment 400, the target element rendering module 220 may materialize the sexual stimulation device 404 with the target element such as a 3D virtual character (see, 406). In other words, the target element rendering module 220 may replace the sexual stimulation device 404 in the MR environment 400 with the virtual character 406 (i.e., the target element). In this scenario, the virtual character 406 corresponds to a virtual human character. The virtual character may be a simulation of the user (e.g., the user 102*a*) or the virtual representation of the user 102*a*.

The sexual stimulation device 404 is configured to perform a penetration action (i.e., the set of predefined actions) to the model user 402 for providing sexual stimulation. To that effect, the virtual character 406 in the MR environment 400 is rendered to perform the penetration action to the model user 402 (as shown in FIG. 4A). It is to be noted that the access to the MR environment 400 is restricted to the user 102*a* in the live broadcast for allowing the use 102*a* to view the virtual character 406 as the target element performing the penetration action on the model user 402. Further, other users (such as the users 102*b* and 102*c*) may perform similar operations as mentioned above for materializing the sexual stimulation device in the live broadcast or the video content rendered in the MR environment 400. Also, the users (e.g., the user 102*a*) may view their own defined 3D characters performing sexual activities with the model users, thereby providing users with better sexual stimulation as explained with reference to FIG. 2.

Figure 4B:
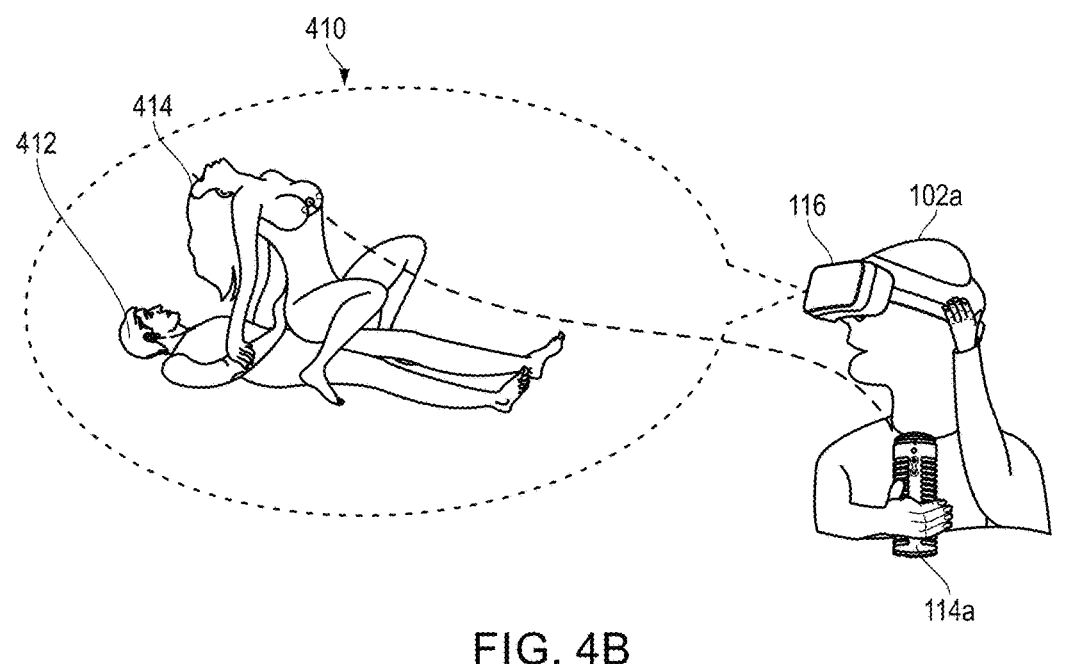
FIG. 4B illustrates an example scenario of an MR environment depicting the materializing of a sexual stimulation device associated with the user, in accordance with an embodiment of the present disclosure.

FIG. 4B illustrates an example scenario of an MR environment 410 depicting materializing of the sexual stimulation device 114*a* associated with the user 102*a*, in accordance with an embodiment of the present disclosure. In this scenario, the user 102*a* may use the sexual stimulation device 114*a* (e.g., a male masturbation device) for masturbating. The head-mounted display 116 renders the MR environment 410 for enabling the user 102*a* to watch the content rendered by the platform 122. The content rendered in the MR environment 410 may initially include a female character 414 performing the sexual activity. In particular, the head-mounted display 116 associated with the user 102a identifies the sexual stimulation device 114a of the user 102a as the entity. Thereafter, the target element rendering module 220 may render a virtual character (see, 412 of FIG. 4B) based on identifying the sexual stimulation device 114a. As shown, the virtual character 412 performing intercourse with the female character 414 is rendered in the MR environment 410 to the user 102a. In other words, the target element rendering module 220 renders the virtual character 412 (e.g., a male model) based on the sexual stimulation device 114a. Further, the target element rendering module 220 facilitates the virtual character 412 to perform the set of predefined actions (e.g., intercourse) on the female character 414 corresponding to the masturbation action performed by the sexual stimulation device 114a. Herein, the set of predefined actions of the virtual character 412 corresponds to a signal transmission (send to/receive from) associated with the sexual stimulation device 114a. The signal includes a control instruction for controlling the sexual stimulation device 114a. In particular, the control instruction generation module 222 may generate the control instruction corresponding to the masturbation action of the sexual stimulation device 114a (i.e., the entity). Thereafter, the target element rendering module 220 renders the target element and the set of predefined actions in the MR environment 410 in response to the control instruction. In addition, the signal may include a sensor signal detected by sensors (not shown in figures) of the sexual stimulation device 114a. The sensors of the sexual stimulation device 114a may include a gyroscope. Similarly, the target element rendering module 220 renders the set of predefined actions of the virtual character based on the sensor signal received from the sexual stimulation device 114a (such as a gyroscope).

Further, in both the example scenarios explained with references to FIGS. 4A and 4B, the user 102a may use the head-mounted display 116 to scan the morphology of the user 102a in three dimensions. Thereafter, the head-mounted display 116 outputs the 3D body image of the user 102a. The 3D body image of the user 102a may be composed of multiple independent body parts of the user 102a such as hands, torso, legs, chest, abdomen, etc. Further, the user 102a may also scan facial expression using the head-mounted display 116. Thereafter, the head-mounted display 116 outputs the 3D virtual character of the user 102a based on the results of the 3D body image and the facial expression. As such, the 3D virtual character of the user 102a is rendered in the MR environment for different applications as explained with references to FIGS. 4A and 4B.

Figure 5:
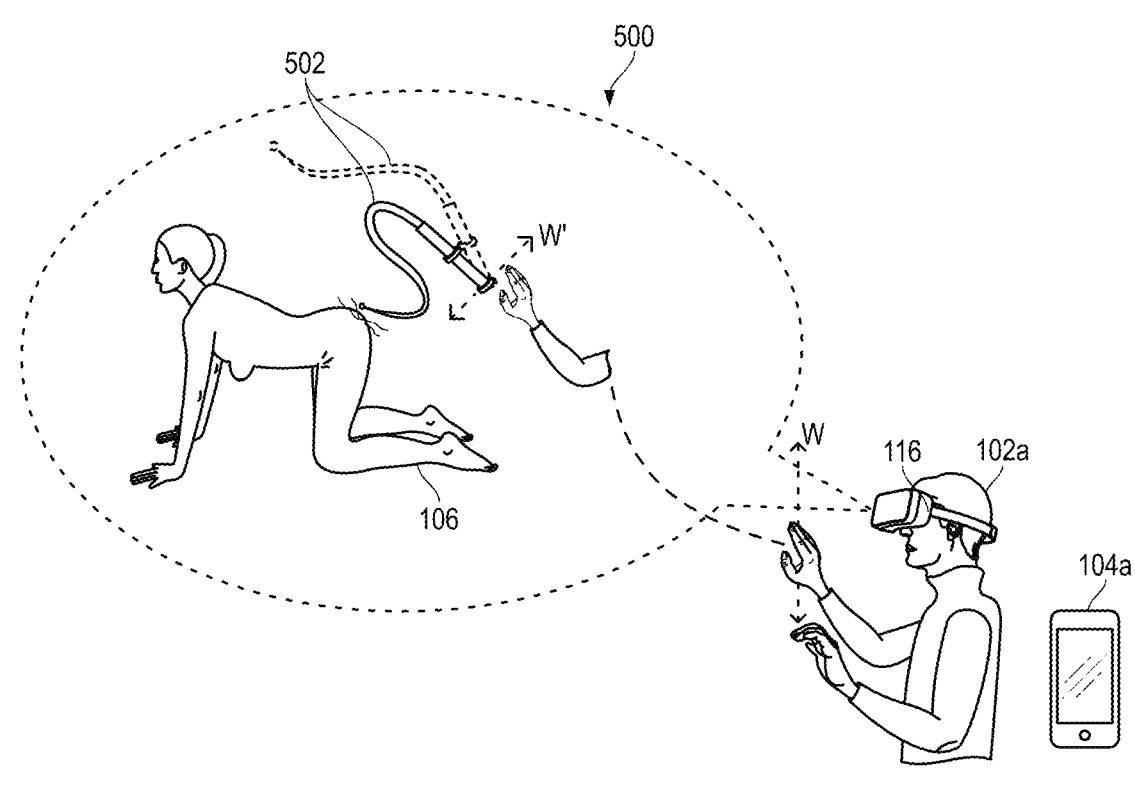
FIG. 5 illustrates an example scenario of an MR environment depicting the operation of a target element based on the interaction inputs, in accordance with an embodiment of the present disclosure.

FIG. 5 illustrates an example scenario of an MR environment 500 depicting the operation of a target element based on interaction inputs, in accordance with an embodiment of the present disclosure. As shown, the user 102a may provide the interaction inputs to interact with, for example, the content rendered in the MR environment 500. In one scenario, the user 102a may provide tokens to the model user 106 in the content to provide tokens for rendering a target element (see, 502) in the MR environment 500. As explained above, the user 102a may be required to provide the tokens equivalent to the threshold value to activate the target element feature. The target element 502 may be a visual effect such as a whip rendered in the content. Some non-limiting examples of the visual effect (i.e., the target element 502) may include, but are not limited to, such as comments associated with the live broadcast, real-time statistical data associated with the live broadcast, and a virtual character associated with the model user. Further, the target element 502 rendered in the MR environment 500 may be a 3-dimensional (3D) effect.

The head-mounted display 116 associated with the user 102a captures the hand movement (i.e. the interaction inputs) of the user 102a. To that effect, the target element rendering module 220 renders the target element 502 at the position of the user's 102a hand in the MR environment 500 based on the location coordinate of the user's 102a hand. Furthermore, the head-mounted display 116 tracks the gestures of the user 102a for operating the target element 502. The gestures performed by the user 102a may be waving the hand in the MR environment 500. In this scenario, the head-mounted display 116 renders a portion of the user's hand in the MR environment 500 for depicting the movement of the user's 102a hand for waving the whip (i.e., the target element 502). The portion of the user's hand depicting waving action in the MR environment 500 is exemplarily represented as W'. Thus, when the user's hand is waved, the target element 502 (the whip) swings along with the hand and falls on the body of the model user 106 (as shown in FIG. 5).

In an embodiment, the target element 502 may be displayed in the live broadcast created by the model user 106. In this scenario, the target element 502 rendered in the live broadcast is streamed to the users 102a-102c of the live broadcast. It is to be noted that, even users without the head-mounted display 116 may view the target elements (e.g., the target element 502) rendered in the live broadcast of the model user 106 on their respective user devices.

In addition, the users 102a-102c may customize the threshold value associated with different target elements rendered by the platform 122. Further, the number of tokens and the target elements may be selected automatically based on different gestures performed by the users (i.e., the users 102a-102c) in the MR environment 500. In an embodiment, the users 102a-102c may customize a set of input data gestures (i.e., the interaction inputs) for providing inputs related to the number of tokens. It is to be noted that, each input data gesture represents different tokens for providing the input data in the live broadcast. As such, the head-mounted display 116 associated with the users 102a-102c may recognize the set of input data gestures and provide the number of tokens to the model user 106 in the live broadcast.

Figure 6A:
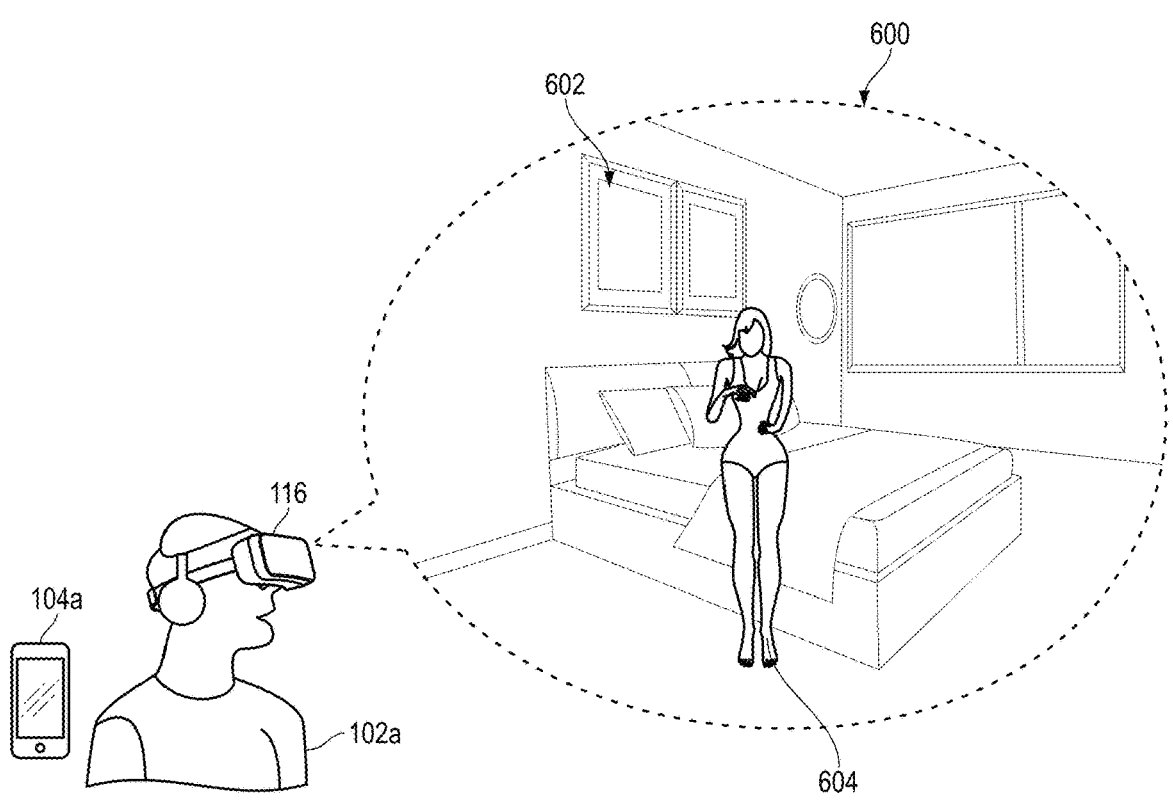
FIG. 6A illustrates an example scenario of an MR environment depicting the rendering of a target element corresponding to a scene information, in accordance with an embodiment of the present disclosure.

FIG. 6A illustrates an example scenario of an MR environment 600 depicting the rendering of a target element corresponding to a scene information, in accordance with an embodiment of the present disclosure. The head-mounted display 116 is configured to capture a scene information (see, 602) in the field of view of the user 102a. In this example scenario, the scene information 602 in the field of view of the user 102a is identified as the entity. The scene information 602 in the field of view of the user 102a is exemplarily depicted to be a bedroom. In this scenario, the target element rendering module 220 is configured to determine at least one target element (see, 604) from the predefined target elements list corresponding to the scene information 602. In this example scenario, the target element 604 is determined to be a female model for the scene information 602. Further, the target element rendering module 220 renders the target element 604 in the field of view of the user 102a by merging the target element 604 in the scene information 602 rendered in the field of view of the user 102a.

Figure 6B:
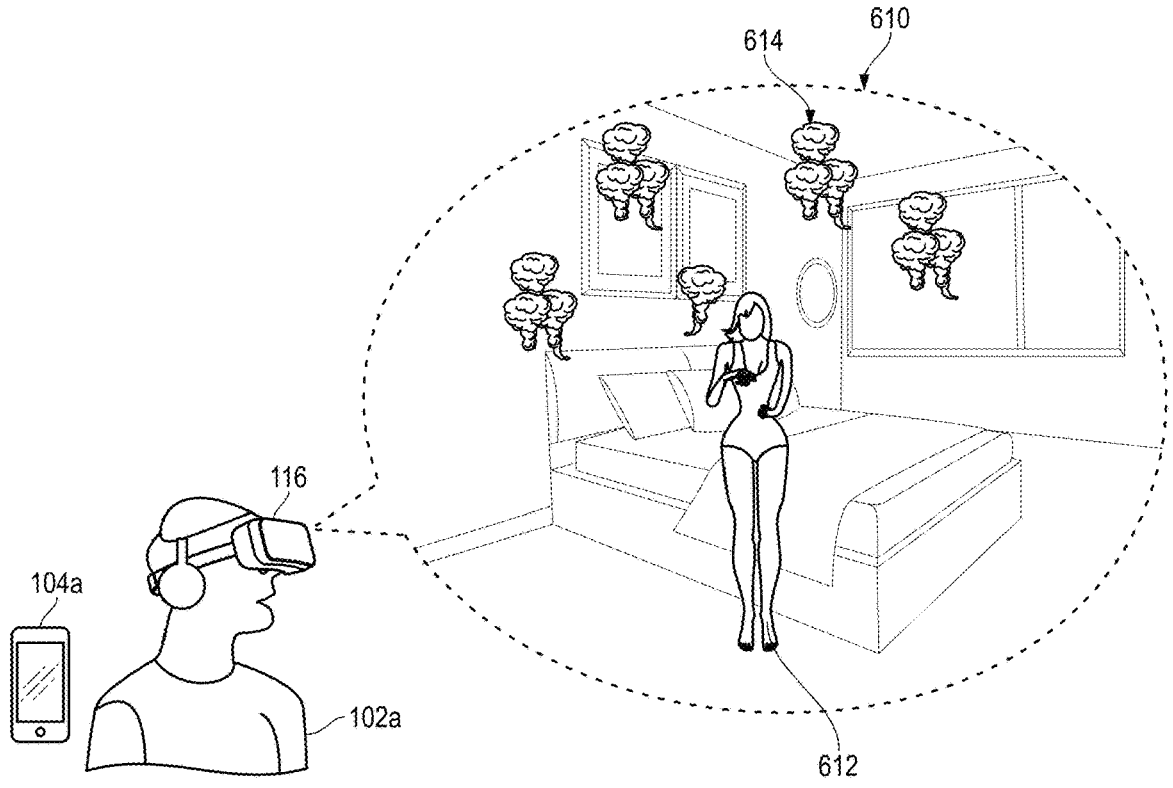
FIG. 6B illustrates an example scenario of an MR environment depicting the rendering of a visual effect as the target element, in accordance with an embodiment of the present disclosure.

FIG. 6B illustrates an example scenario of an MR environment 610 depicting the rendering of a visual effect as the target element, in accordance with an embodiment of the present disclosure. The MR environment 610 is depicted to include a model user 612 performing sexual content. Further, the head-mounted display 116 is configured to detect one or more preset parameters defined in the one or more preset information for identifying entities. The preset parameters may include ambient conditions, activities of the user, and the like. In this scenario, the head-mounted display 116 may include a plurality of sensors (not shown in FIGS.) to detect the preset parameters such as the ambient condition. Alternatively, the user device 104a or the sexual stimulation device 114a may be configured to detect the ambient condition. The ambient condition may include, but not limited to, temperature, humidity, or weather conditions. In this example scenario, the ambient condition may be identified as the entity for determining the target element. For example, the head-mounted display 116 may detect the ambient temperature is lower than 16° C. In this scenario, the target element rendering module 220 renders the visual effect of snow (see, 614) as the target element in the field of view of the user 102a.

Figure 6C:
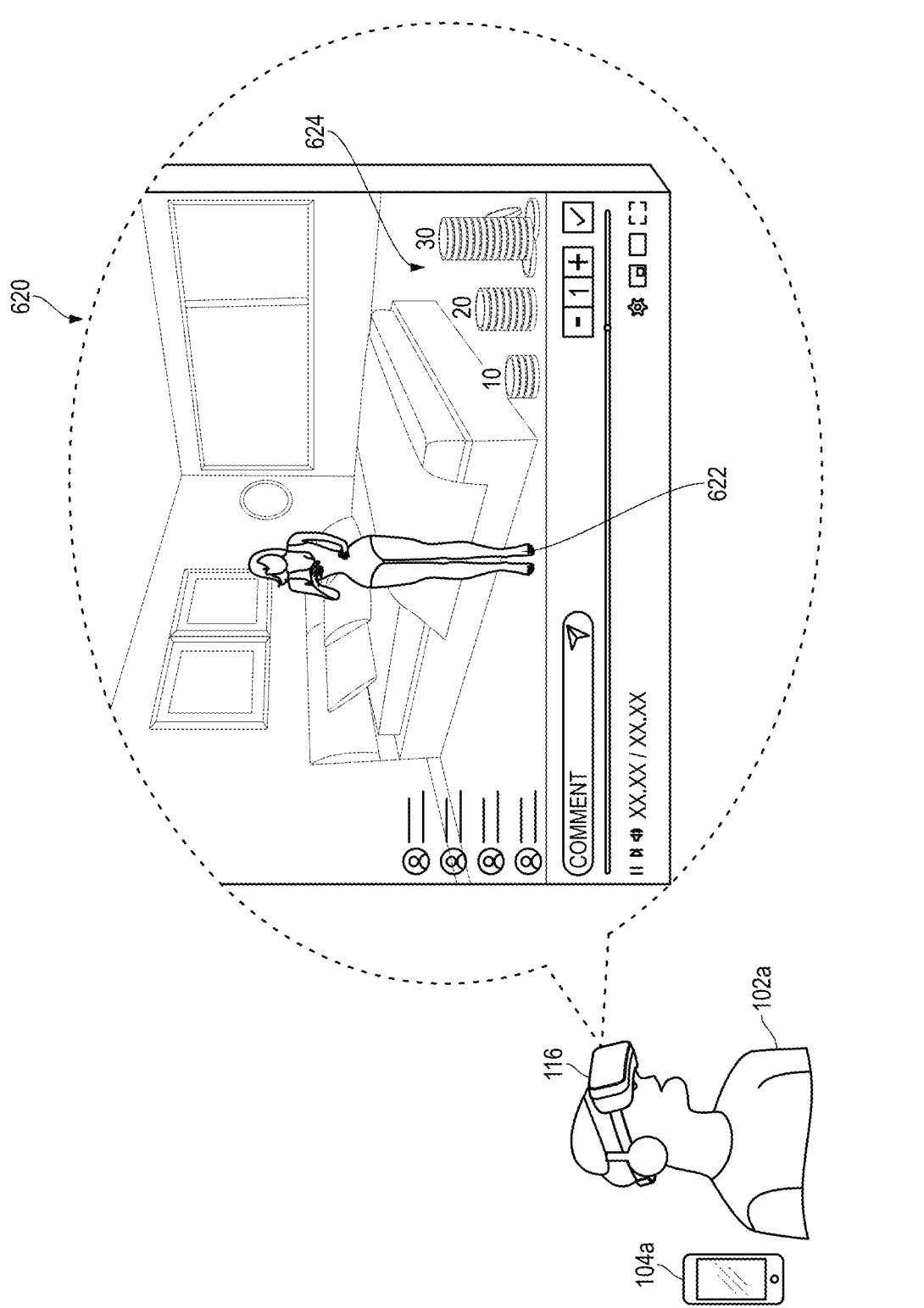
FIG. 6C illustrates an example scenario of an MR environment depicting the rendering of tokens as the target element, in accordance with an embodiment of the present disclosure.

FIG. 6C illustrates an example scenario of an MR environment 620 depicting the rendering of tokens as the target element, in accordance with an embodiment of the present disclosure. The MR environment 620 is depicted to include a model user 622 performing a sexual live broadcast. In this example scenario, the head-mounted display 116 may be configured to track the preset parameters (such as the user activities of the user 102a) while the user 102a is viewing the live broadcast of the model user 622. For example, the user activities may include providing preset tokens by the user 102. The preset tokens may be set as '10 tokens'. In this example scenario, the preset tokens are identified as the entity. As the user 102a provides 10 tokens to the model user 622, the target element rendering module 220 renders a preset amount of tokens (see, 624) as the target element in the field of view of the user 102a. For illustration purposes, the preset amount of tokens 624 is rendered as 10 tokens, 20 tokens, and 30 tokens. The user 102a may select one option among the preset amount of tokens 624 to provide the tokens to the model user 622 of the live broadcast. In addition, the target element rendering module 220 may render an overall token associated with the user 102a on the live broadcast for allowing the user 102a to provide the tokens to the model user 622.

In addition, the target element rendering module 220 is configured to detect the body part of a user (e.g., the model user 622) as the at least one entity. Further, the target element rendering module 220 monitors the body part of the model user 622 to detect if the body part of the model user 622 performs the set of predefined actions. For example, the body part of the model user 622 may be 'chest' and the set of predefined actions performed by the model user 622 on the body part may be 'squeezing of the chest'. In this scenario, the target element rendering module 220 renders a virtual object corresponding to the identification of the body part of the model user 622. The virtual object may be virtual tokens (as shown in FIG. 6C). Further, the processor 206 is configured to render an instruction for providing the tokens corresponding to the set of predefined actions of the body part (e.g., squeezing the chest). The instruction for providing the tokens may allow the user 102c to provide the tokens to other users (such as the users 102a-102c).

Figure 7A:
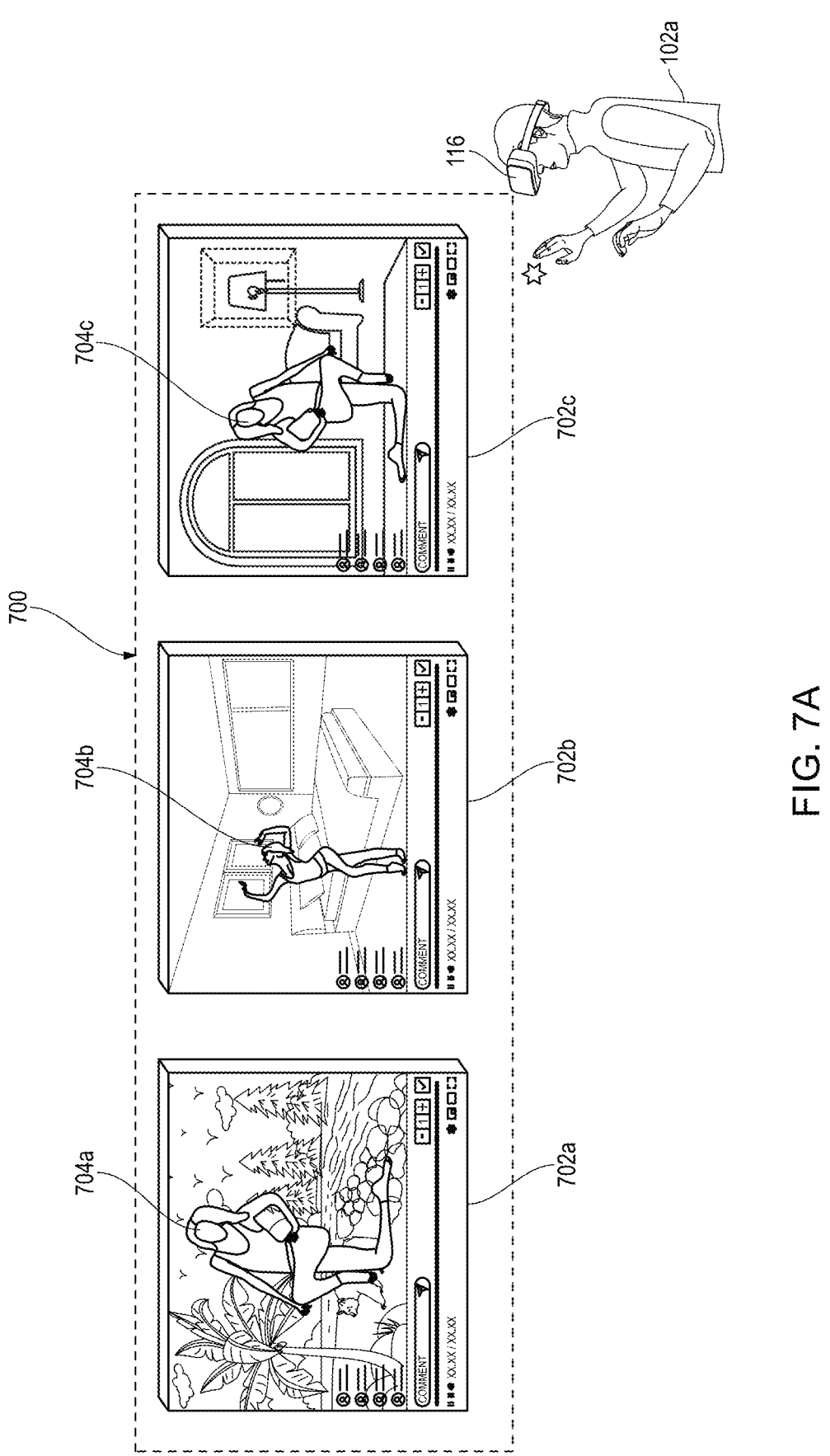
FIGS. 7A and 7B illustrate an example scenario of MR environments depicting the rendering of multiple target elements, in accordance with an embodiment of the present disclosure.
Figure 7B:
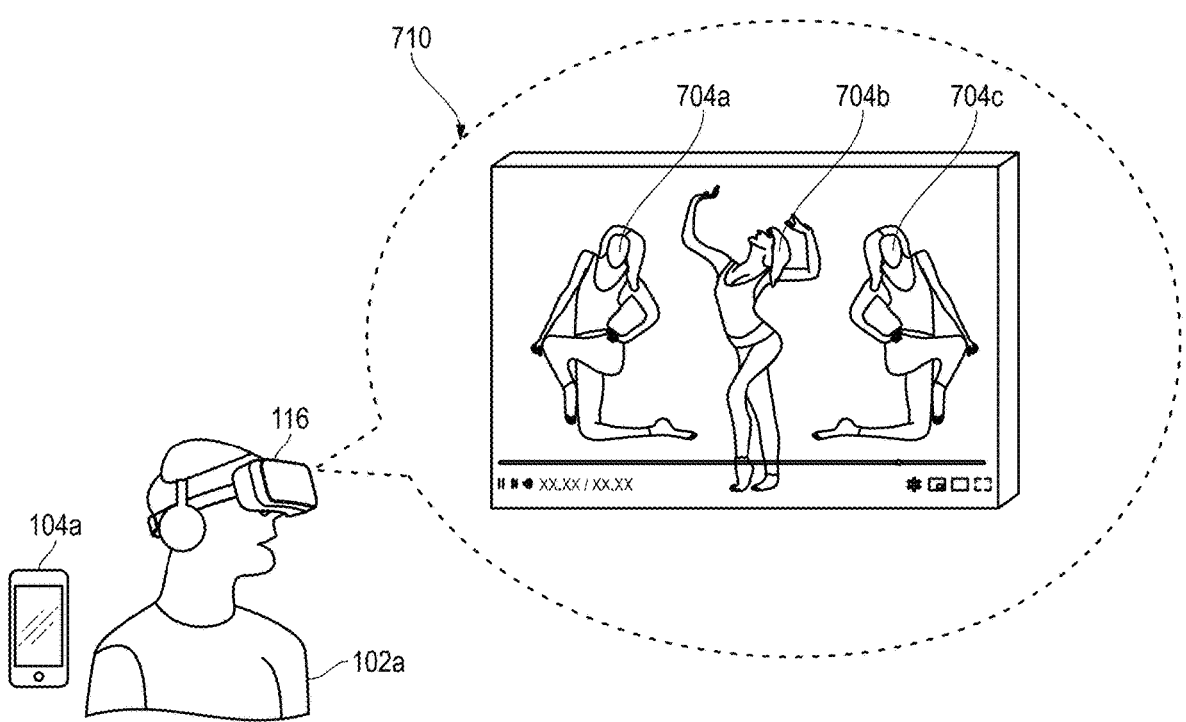

FIGS. 7A and 7B illustrate an example scenario of MR environments depicting the rendering of multiple target elements, in accordance with an embodiment of the present disclosure.

Referring to FIG. 7A, an MR environment 700 is rendered in the field of view of the user 102a by the head-mounted display 116. The MR environment 700 is depicted to include multiple contents such as content 702a, content 702b, and content 702c. The contents 702a-702c are exemplarily depicted to be sexual content or a sexual live broadcast. The contents 702a-702c are performed by respective models such as model 704a, model 704b, and model 704c. The entity identification module 218 is configured to identify entities in the contents 702a-702c. For example, the entity identification module 218 identifies the models 704a-704c of the respective contents 702a-702c as the entities. Thereafter, the target element rendering module 220 extracts the entities (i.e., the models 704a-704c) from each of the respective contents 702a-702c based on applying one or more image processing techniques. Further, the target element rendering module 220 renders the models 704a-704c as the target element in an MR environment 710 (as shown in FIG. 7B). As shown in FIG. 7B, the models 704a-704c (i.e., the target elements) are rendered as a single content in the field of view of the user 102a. Thus, the user 102a may watch the performances of multiple models (i.e., the models 704a-704c) in the same environment (i.e., the MR environment 710) at the same time.

Figure 8A:
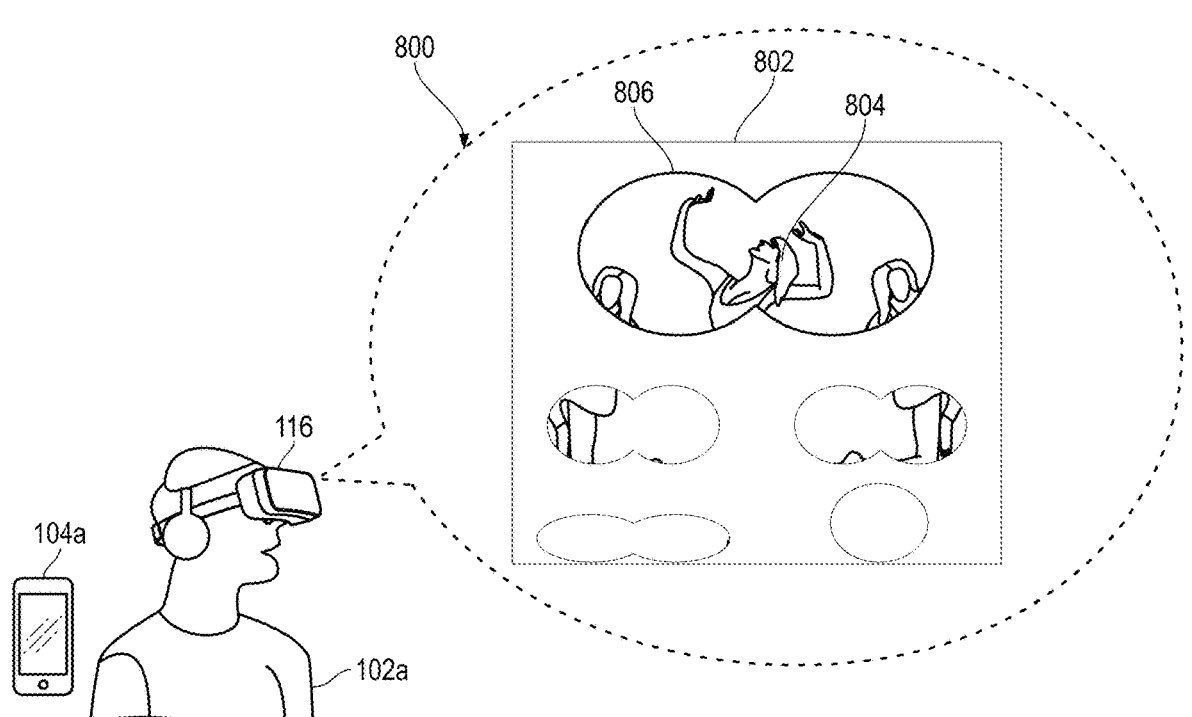
FIGS. 8A and 8B illustrate an example scenario of MR environments depicting the rendering of the content in the field of view of the user based on viewing mode selection, in accordance with an embodiment of the present disclosure.
Figure 8B:
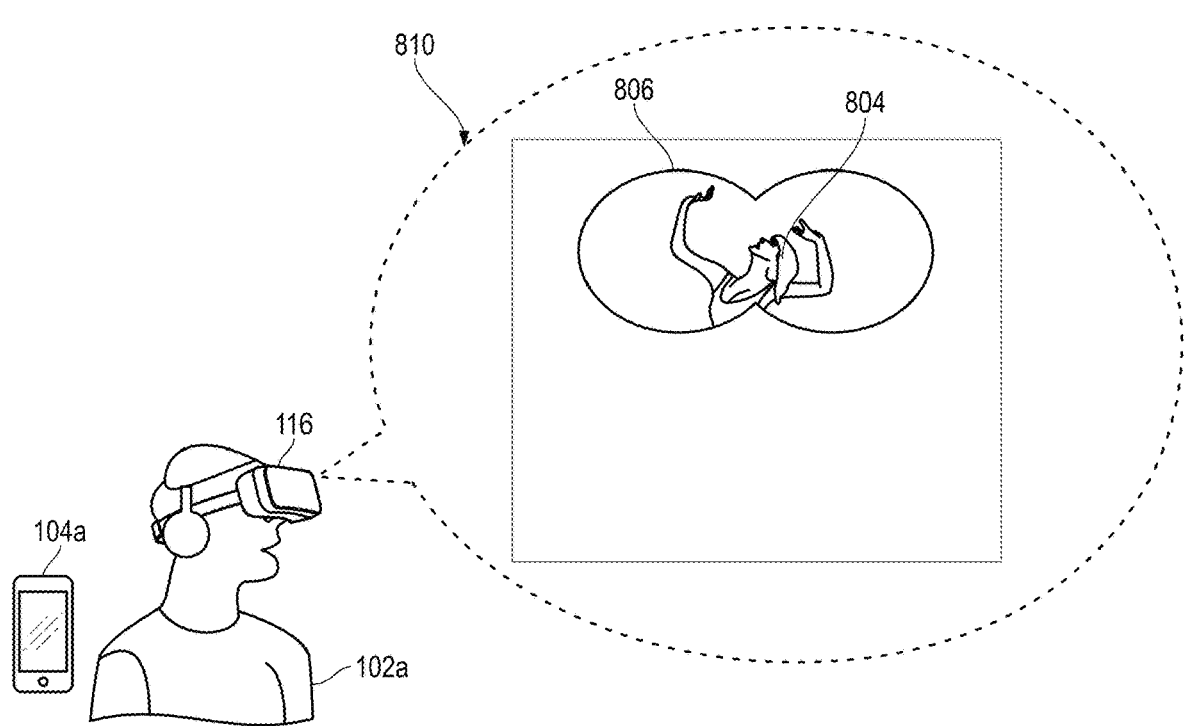

FIGS. 8A and 8B illustrate an example scenario of MR environments depicting the rendering of the content in the field of view of the user 102a based on viewing mode selection, in accordance with an embodiment of the present disclosure.

As shown in FIG. 8A, the user 102a is rendered with an MR environment 800 in the field of view of the user 102a by the head-mounted display 116. The MR environment 800 is depicted to include multiple viewing modes 802 for viewing a content (see, 804). The user 102a may provide the interaction inputs to select a viewing mode, for example, a viewing mode 806 among the multiple viewing modes 802. The selection of the viewing mode 806 is indicated using a bold outline around the content 804. Upon selection of the viewing mode 806, the user 102a is rendered with an MR environment 810 depicting for depicting the content 804 in the selected viewing mode 806 (as shown in FIG. 8B). In an embodiment, the target element may be rendered in the field of view of the user 102a based on the selection of the viewing mode. In one example scenario, when a viewer (such as the user 102a) enters a model's live broadcast room, the user 102a is able to view limited content from a limited perspective (as shown in FIG. 8A). Further, when the user 102a provides tokens to the model of the live broadcast, the user 102a may be provided to view the content of the live broadcast room from a wider perspective (as shown in 704b of FIG. 7A).

Figure 9:
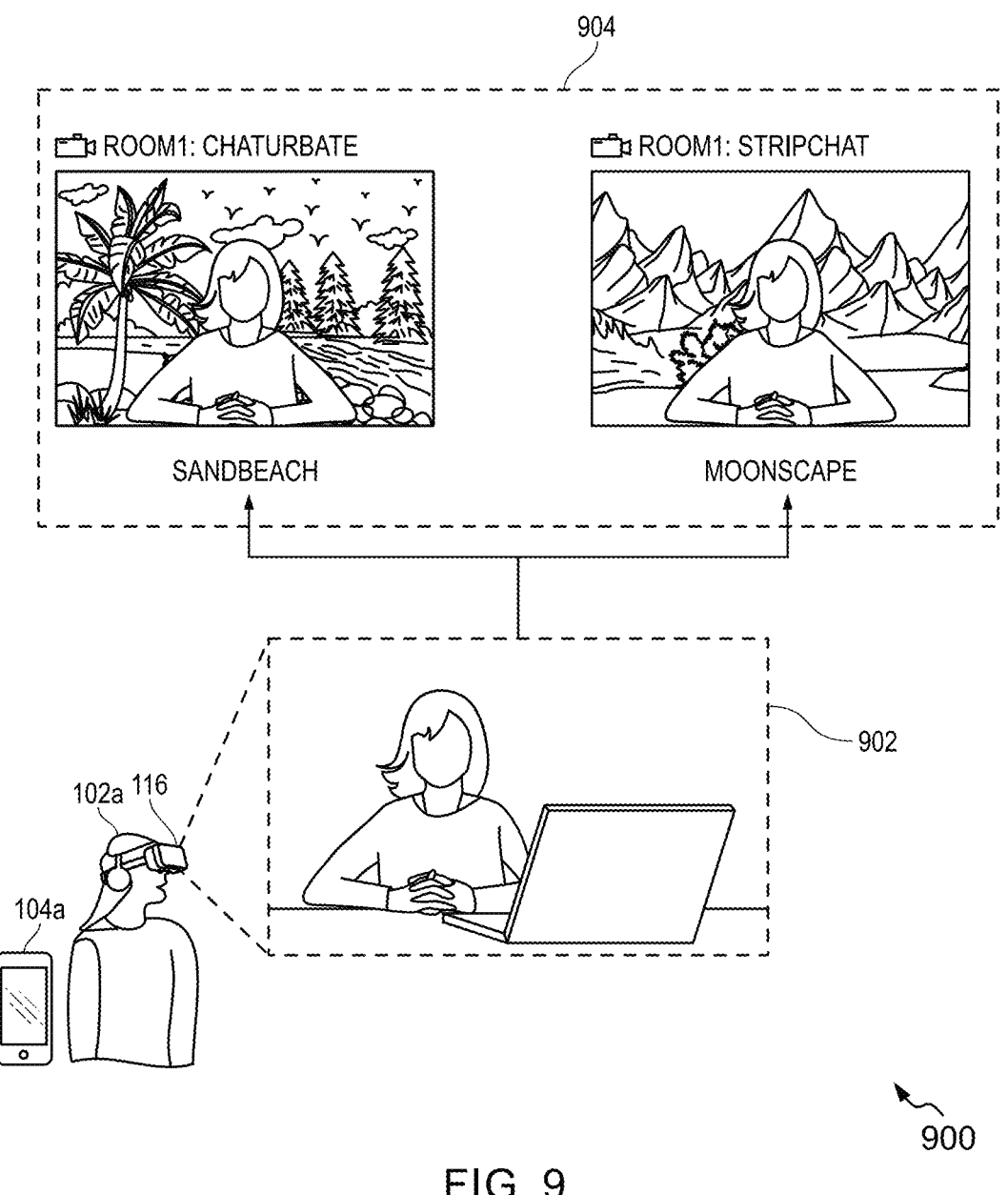
FIG. 9 illustrates an example scenario of an MR environment for allowing the user to customize a background environment of content, in accordance with an embodiment of the present disclosure.

FIG. 9 illustrates an example scenario of an MR environment 900 for allowing the user 102a to customize a background environment of a content 902 (e.g., live broadcast), in accordance with an embodiment of the present disclosure. The user 102a may be allowed to customize the background of the content 902 through the head-mounted display 116. As shown, the user 102a may be provided with a list of background options (see, 904) for allowing the user 102a to customize the background of the content 902. The list of background options 904 may be predefined in the platform 122. Some examples of the background environment may include, but are not limited to, beach, space, mountains, or any other environment. The user 102a may provide inputs for selecting a background environment from the list of background options 904 rendered by the head-mounted display 116. For illustration purposes, the list of background options 904 is depicted to include a sand beach environment and a moonscape environment. Upon selection of the background environment, the head-mounted display 116 fuses (performs layering) the content 902 with the selected background environment based on an image fusing technique. In other words, the user 102a can switch background environments to create a scene that matches the content 902 (e.g., the live broadcast).

Figure 10:
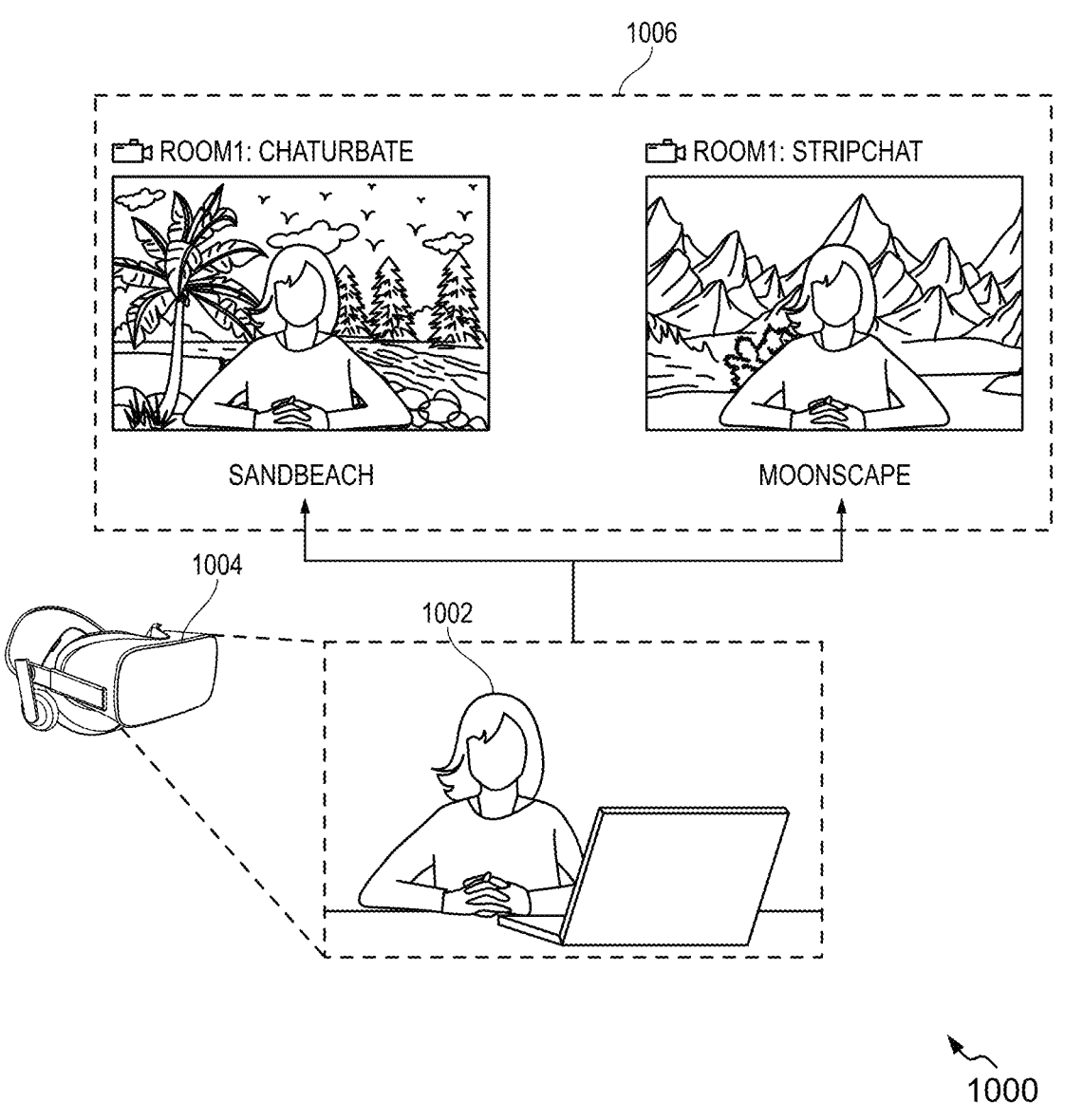
FIG. 10 illustrates an example scenario of an MR environment for allowing a model user to customize the background environment, in accordance with an embodiment of the present disclosure.

FIG. 10 illustrates an example scenario of an MR environment 1000 for allowing a model user to customize a background environment, in accordance with an embodiment of the present disclosure. As shown, a model user 1002 is associated with a head-mounted display 1004. The model user 1002 may use the head-mounted display 1004 to capture the content of the model user 1002. In this scenario, the model user 1002 is provided the access to customize (i.e., replace) the background environment of the content being captured by the head-mounted display 1004. More specifically, the head-mounted display 1004 associated with the model user 1002 may render a list of background environment 1006 in the field of view of the model user 1002 by the head-mounted display 1004 for allowing the model user 1002 to select a background environment from the list of background environment 1006. Thereafter, the selected background environment is fused with the content of the model user 1002 and is made available to the viewers (i.e., the users 102a-102c) of the content.

Figure 11:
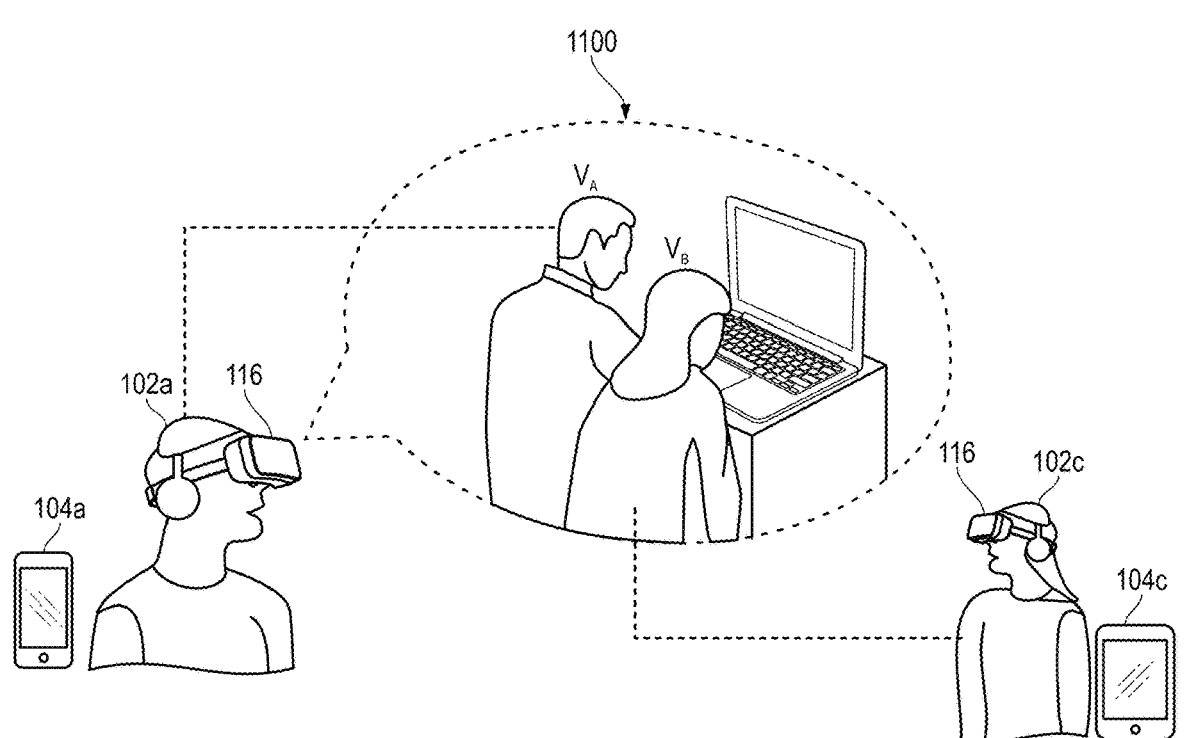
FIG. 11 is an example scenario of an MR environment depicting interaction between users viewing same content using the head-mounted display, in accordance with an embodiment of the present disclosure.

FIG. 11 is an example scenario of an MR environment 1100 depicting interaction between users viewing a similar content using the head-mounted display, in accordance with an embodiment of the present disclosure. As shown, the user 102a uses the head-mounted display 116 for viewing a content (e.g., the live broadcast performed by the model user 106) in the MR environment 1100. Further, the user 102a may send an invite to another viewer (e.g., the user 102c) of the content for viewing the content together. It is to be noted that both the users 102a and 102c are viewing the same content (i.e., the live broadcast of the model user 106). Once the user 102c approves the invite by providing inputs in the user device 104c, the MR environment 1100 is rendered in the field of view of the users 102a-102c by their corresponding head-mounted displays 116. The MR environment 1100 depicts virtual characters representing the user 102c and the user 102a. The virtual characters of the users 102a and 102c are exemplarily represented as 'Va' and 'Vb', respectively. The virtual characters 'Va' and 'Vb' in the MR environment 1100 are depicted as viewing the live broadcast together.

In addition, the platform 122 allows the user 102a and the user 102c to interact with each other through various interactive features associated with the platform 122. The interactive features of the platform 122 may include, but are not limited to, a voice chat, real-time comments, and sharing viewing experience. In this scenario, the combined operation of the system 200 and the head-mounted display 116 of the user 102a reflects the interactions of the users 102a and 102c in the MR environment 1100. In other words, the interactions of the users 102a and 102c are reflected in the MR environment 1100 using the virtual characters 'Va' and 'Vb', respectively.

Figure 12:
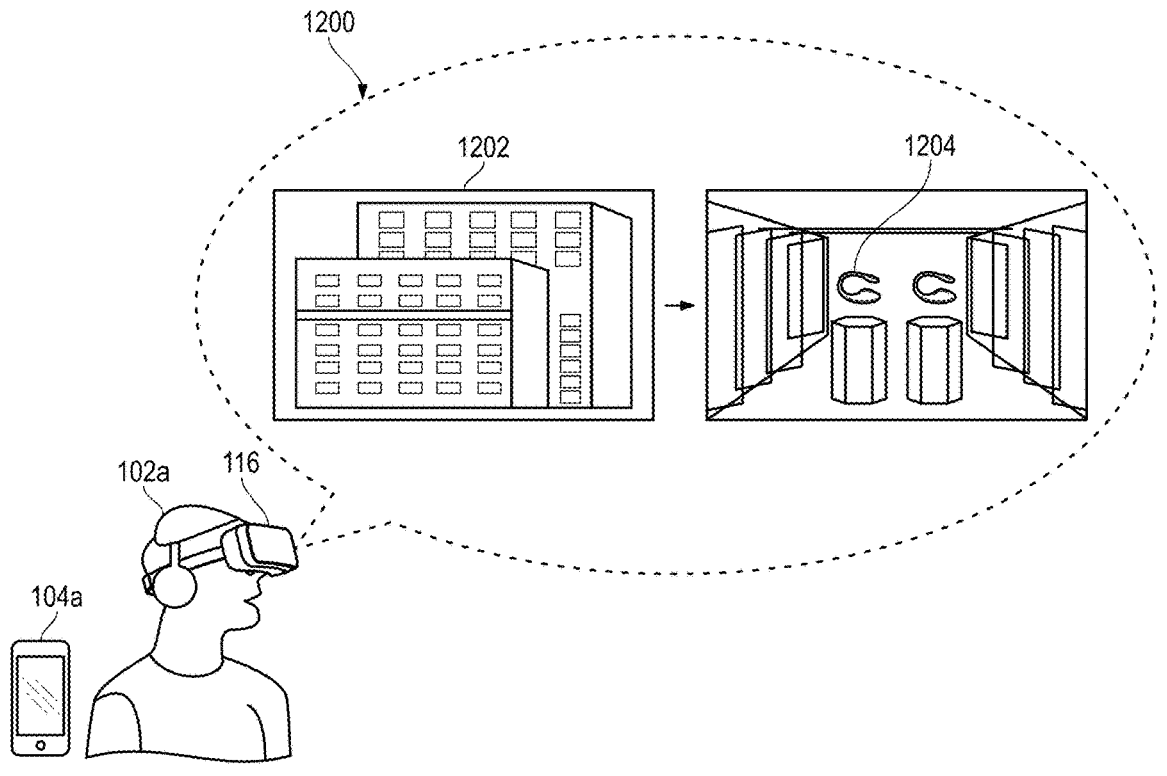
FIG. 12 is an example scenario of an MR environment for providing a virtual shopping experience to users, in accordance with an embodiment of the present disclosure.

FIG. 12 is an example scenario of an MR environment 1200 for providing a virtual shopping experience to users, in accordance with an embodiment of the present disclosure. The user 102a may use the head-mounted display 116 for the virtual shopping experience in the MR environment 1200. In particular, the user 102a may access an online shopping portal in the user device 104a. In an embodiment, the online shopping portal may be hosted and managed by the system

200, and products (see, 1204) of the online shopping portal may include sexual stimulation devices. In this scenario, the head-mounted display 116 may be configured to render a shopping mall (see, 1202) in the virtual environment 1200 to provide a real shopping experience in the MR environment 1200. The head-mounted display 116 may render the products 1204 (e.g., the sexual stimulation devices) of the online shopping portal to be arranged and/or displayed as in the shopping mall. The user 102a may provide inputs (e.g., hand gestures or eye movement) to select a product among the products 1204 in the MR environment 1200. For example, the user's eye 102a focuses on the product in the MR environment 1200. The head-mounted display 116 tracks the movement of the eye and selects the product for the user 102a in the MR environment 1200. Upon selection, the system 200 may cause the head-mounted display 116 to display at least a functionality or working of the selected product and product description in the MR environment 1200.

FIG. 13 illustrates a flow diagram of a computer-implemented method 1300 for rendering simulated environments to provide enhanced sexual experience, in accordance with an embodiment of the present disclosure. The method 1300 depicted in the flow diagram may be executed by, for example, the system 200 or the system 120. Operations of the flow diagram of the method 1300, and combinations of the operations in the flow diagram of the method 1300, may be implemented by, for example, hardware, firmware, a processor, circuitry, and/or a different device associated with the execution of software that includes one or more computer program instructions. It is noted that the operations of the method 1300 can be described and/or practiced by using a system other than the system 200. The method 1300 starts at operation 1302.

At operation 1302, the method 1300 includes identifying, by the processor 206, at least one entity based on monitoring one or more preset information. The one or more preset information defined for identifying the at least one entity includes at least one of information associated with one or more objects rendered in a field of view of a user 102a of a plurality of users 102a-102c by a head-mounted display (HMD) 116 associated with the user 102a, information related to other users 102b-102c of the plurality of users 102a-102c communicated with the user 102a in real-time, and information related to the user 102a associated with the head-mounted display (HMD).

At operation 1304, the method 1300 includes determining, by the processor 206, at least one target element corresponding to the at least one entity identified based on the one or more preset information.

At operation 1306, the method 1300 includes rendering, by the processor 206, the at least one target element in the field of view of the user 102a associated with the head-mounted display (HMD) 116. The at least one target element is dynamically rendered in the field of view of the user 102a by the head-mounted display (HMD) 116. The at least one target element is configured to perform a set of predefined actions corresponding to the at least one entity. Further, the one or more operations for rendering simulated environments to provide enhanced sexual experience are already explained with reference to FIGS. 1-12, therefore they are not reiterated herein for the sake of brevity.

Figure 14:
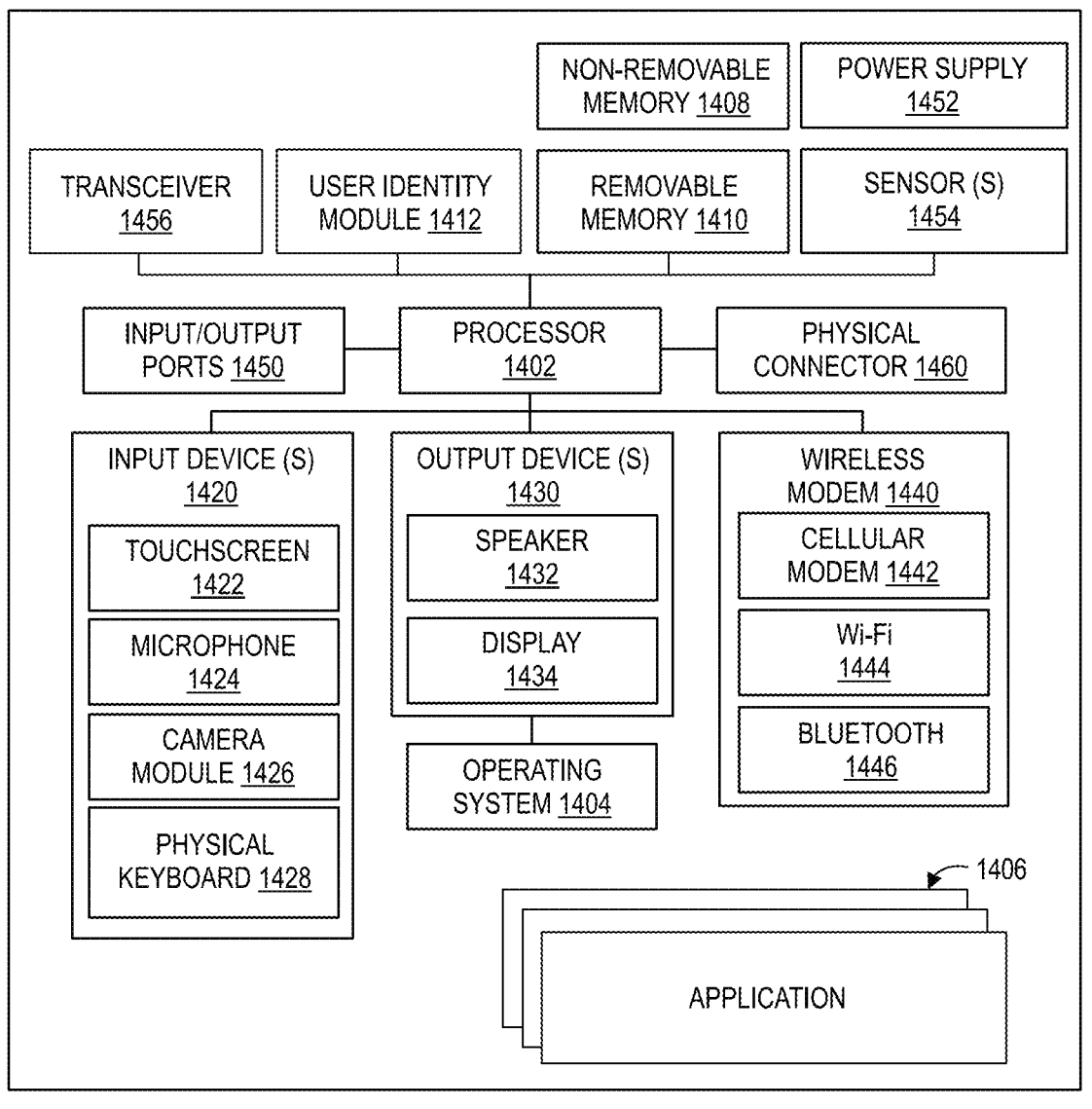
FIG. 14 is a simplified block diagram of an electronic device capable of implementing various embodiments of the present disclosure.

FIG. 14 is a simplified block diagram of an electronic device 1400 capable of implementing various embodiments of the present disclosure. For example, the electronic device 1400 may correspond to the user devices 104a-104c, the user device 108, and the head-mounted displays 116 and 126 of FIG. 1. The electronic device 1400 is depicted to include one or more applications 1406. For example, the one or more applications 1406 may include the platform 122 of FIG. 1. The one or more applications 1406 installed on the electronic device 1400 is capable of communicating with a server (i.e., the system 200 or the system 120) to render simulated MR environments for providing enhanced sexual experience.

It should be understood that the electronic device 1400 as illustrated and hereinafter described is merely illustrative of one type of device and should not be taken to limit the scope of the embodiments. As such, it should be appreciated that at least some of the components described below in connection with the electronic device 1400 may be optional and thus in an embodiment may include more, less, or different components than those described in connection with the embodiment of the FIG. 14. As such, among other examples, the electronic device 1400 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1400 includes a controller or a processor 1402 (e.g., a signal processor, microprocessor, ASIC, or other control and processing logic circuitry) for performing such tasks as signal coding, data processing, image processing, input/output processing, power control, and/or other functions. An operating system 1404 controls the allocation and usage of the components of the electronic device 1400 and supports one or more operations of the application (see, the applications 1406) that implements one or more of the innovative features described herein. In addition, the applications 1406 may include common mobile computing applications (e.g., telephony applications, email applications, calendars, contact managers, web browsers, messaging applications) or any other computing application.

The illustrated electronic device 1400 includes one or more memory components, for example, a non-removable memory 1408 and/or removable memory 1410. The non-removable memory 1408 and/or the removable memory 1410 may be collectively known as a database in an embodiment. The non-removable memory 1408 can include RAM, ROM, flash memory, a hard disk, or other well-known memory storage technologies. The removable memory 1410 can include flash memory, smart cards, or a Subscriber Identity Module (SIM). The one or more memory components can be used for storing data and/or code for running the operating system 1404 and the applications 1406. The electronic device 1400 may further include a user identity module (UIM) 1412. The UIM 1412 may be a memory device having a processor built in. The UIM 1412 may include, for example, a subscriber identity module (SIM), a universal integrated circuit card (UICC), a universal subscriber identity module (USIM), a removable user identity module (R-UIM), or any other smart card. The UIM 1412 typically stores information elements related to a mobile subscriber. The UIM 1412 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1400 can support one or more input devices 1420 and one or more output devices 1430. Examples of the input devices 1420 may include, but are not limited to, a touch screen/a display screen 1422 (e.g., capable of capturing finger tap inputs, finger gesture inputs, multi-finger tap inputs, multi-finger gesture inputs, or keystroke inputs from a virtual keyboard or keypad), a microphone 1424 (e.g., capable of capturing voice input), a camera module 1426 (e.g., capable of capturing still picture images and/or video images) and a physical keyboard 1428. Examples of the output devices 1430 may include, but are not limited to, a speaker 1432 and a display 1434. Other possible output devices can include piezoelectric or other haptic output devices. Some devices can serve more than one input/output function. For example, the touch screen 1422 and the display 1434 can be combined into a single input/output device.

A wireless modem 1440 can be coupled to one or more antennas (not shown in FIG. 14) and can support two-way communications between the processor 1402 and external devices, as is well understood in the art. The wireless modem 1440 is shown generically and can include, for example, a cellular modem 1442 for communicating at long range with the mobile communication network, a Wi-Fi compatible modem 1444 for communicating at short range with an external Bluetooth-equipped device, or a local wireless data network or router, and/or a Bluetooth-compatible modem 1446. The wireless modem 1440 is typically configured for communication with one or more cellular networks, such as a GSM network for data and voice communications within a single cellular network, between cellular networks, or between the electronic device 1400 and a public switched telephone network (PSTN).

The electronic device 1400 can further include one or more input/output ports 1450, a power supply 1452, one or more sensors 1454 for example, an accelerometer, a gyroscope, a compass, or an infrared proximity sensor for detecting the orientation or motion of the electronic device 1400 and biometric sensors for scanning biometric identity of an authorized user, a transceiver 1456 (for wirelessly transmitting analog or digital signals) and/or a physical connector 1460, which can be a USB port, IEEE 1294 (FireWire) port, and/or RS-232 port. The illustrated components are not required or all-inclusive, as any of the components shown can be deleted and other components can be added.

The disclosed method with reference to FIG. 13, or one or more operations of the system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:

identifying, by a processor, at least one entity from among a plurality of non-virtual objects present in a field of view of a user associated with a head-mounted display (HMD), the at least one entity comprising a sexual stimulation device configured to provide tactile sensory feedback to a user by movement thereof, the at least one entity being identified based on monitoring of at least one item of preset information from among plural items of preset information defined for identifying the at least one entity, the plural items of preset information including (i) information associated with one or more of the plurality of objects present in the field of view of the user associated with the head-mounted display (HMD), (ii) information related to the user associated with the head-mounted display (HMD), and (iii) information related to other users of a plurality of users communicably connected with the user in real-time, and the identifying the at least one entity including (i) identifying an initial position of the at least one entity and (ii) monitoring real-time motion of the at least one entity;

determining, by the processor, at least one target element related to sexual entertainment and corresponding to the at least one entity identified in the identifying, the at least one target element comprising a virtual human character; and rendering, by the processor, the at least one target element in the field of view of the user by the head-mounted display (HMD) with which the user is associated, the rendering the at least one target element including (i) rendering the at least one target element at a position determined based on the initial position of the at least one entity in the field of view of the user by the head-mounted display (HMD) with which the user is associated and (ii) dynamically rendering the at least one target element in the field of view of the user by the head-mounted display (HMD) with which the user is associated so as to perform a set of predefined actions corresponding to the real-time motion of the at least one entity, such that the set of predefined actions of the target element dynamically follow the real-time motion of the at least one entity in real time or substantially real time, wherein the dynamically rendering the at least one target element comprises rendering visual content including the motion of the virtual human character presented to the user by the head-mounted display (HMD) with which the user is associated such that the motion of the virtual human character dynamically follows the tactile sensory feedback provided to the user by the at least one entity according to the real-time motion thereof.

2. The computer-implemented method as claimed in claim 1, wherein the at least one entity comprises at least one of a sexual stimulation device of the user associated with the head-mounted display (HMD), and a sexual stimulation device of another user of the plurality of users.

3. The computer-implemented method as claimed in claim 1, further comprising:

identifying, by the processor, a first entity among the at least one entity in the field view of the user based on the at least one item of preset information;

determining, by the processor, the at least one target element corresponding to the first entity;

determining, by the processor based on visual computing, a location coordinate of the first entity in the field of view of the user associated with the head-mounted display (HMD); and facilitating, by the processor, the head-mounted display (HMD) to render the at least one target element by superimposing the at least one target element on the first entity in the field of view of the user, the at least one target element being superimposed on the first entity in the field of view of the user based on the determined location coordinate of the first entity in the field of view of the user.

4. The computer-implemented method as claimed in claim 1, further comprising:

identifying, by the processor, a second entity among the at least one entity in the field of view of the user based on the at least one item of preset information;

determining, by the processor, the at least one target element corresponding to the second entity;

determining, by the processor based on visual computing, a location coordinate of the second entity in the field of view of the user associated with the head-mounted display (HMD); and facilitating, by the processor, the head-mounted display (HMD) to render the at least one target element along with the second entity in the field of view of the user based on the determined location coordinate of the second entity in the field of view of the user.

5. The computer-implemented method as claimed in claim 1, further comprising:

detecting, by the processor, at least one interaction input provided by the user to interact with the at least one entity and the at least one target element rendered in the field of view of the user by the head-mounted display (HMD), the at least one interaction input corresponding to the information related to the user defined in the plural items of preset information; and generating, by the processor, a control instruction corresponding to the at least one interaction input, the control instruction being configured to control at least one of (i) the at least one target element, (ii) a sexual stimulation device of a model user, and (iii) a sexual stimulation device of the user.

6. The computer-implemented method as claimed in claim 1, further comprising:

identifying, by the processor, the at least one entity present in content displayed in the field of view of the user by the head-mounted device (HMD); and rendering, by the processor, the at least one entity in the content as the at least one target element in the field of view of the user by the head-mounted device (HMD) associated with the user, wherein the at least one entity is rendered as the at least one target element based at least on one or more image processing techniques.

7. The computer-implemented method as claimed in claim 1, wherein at least one of the information related to the user associated with the head-mounted display (HMD) and the information related to the other users of the plurality of users comprises scene information being captured by the head-mounted display (HMD) with which the user is associated, and wherein the method further comprises determining, by the processor, the at least one target element corresponding to the scene information, the at least one target element being rendered in the field of view of the user by merging the at least one target element in the scene information.

8. The computer-implemented method as claimed in claim 1, further comprising generating, by the processor as the at least one target element, data corresponding to morphological data of the user based at least on one or more artificial intelligence (AI) models.

9. The computer-implemented method as claimed in claim 1, wherein at least one of the information related to the user associated with the head-mounted display (HMD) and the information related to the other users of the plurality of users comprises at least ambient conditions and activities of the user.

10. The computer-implemented method as claimed in claim 1, further comprising rendering, by the processor, content in the field of view of the user by the head-mounted display (HMD) with which the user is associated based on selection of a viewing mode by the user.

11. The computer-implemented method as claimed in claim 1, wherein the identifying the at least one entity includes determining whether the at least one item of preset information monitored in the monitoring matches a stored item of preset information.

12. The computer-implemented method as claimed in claim 11, wherein the determining comprises determining, as the at least one target element, a target element from among a plurality of predefined target elements respectively corresponding to the predetermined objects.

13. The computer-implemented method as claimed in claim 1, wherein the virtual human character is rendered so as to replace the sexual stimulation device in the field of view of the user.

14. A system, comprising:

a communication interface;

a memory storing executable instructions; and a processor operatively coupled with the communication interface and the memory, the processor being configured to execute the executable instructions to control the system to execute processes comprising:

identifying at least one entity from among a plurality of non-virtual objects present in a field of view of a user associated with a head-mounted display (HMD), the at least one entity comprising a sexual stimulation device configured to provide tactile sensory feedback to a user by movement thereof, the at least one entity being identified based on monitoring of at least one item of preset information from among plural items of preset information defined for identifying the at least one entity, the plural items of preset information including (i) information associated with one or more of the plurality of objects present in the field of view of the user associated with the head-mounted display (HMD), (ii) information related to other users of a plurality of users communicably connected with the user in real-time, and (iii) information related to the user associated with the head-mounted display (HMD), and the identifying the at least one entity including (i) identifying an initial position of the at least one entity and (ii) monitoring real-time motion of the at least one entity;

determining at least one target element related to sexual entertainment and corresponding to the at least one entity identified in the identifying, the at least one target element comprising a virtual human character; and rendering the at least one target element in the field of view of the user by the head-mounted display (HMD) with which the user is associated, the rendering the at least one target element including (i) rendering the at least one target element at a position determined based on the initial position of the at least one entity in the field of view of the user by the head-mounted display (HMD) with which the user is associated and (ii) dynamically rendering the at least one target element in the field of view of the user by the head-mounted display (HMD) with which the user is associated so as to perform a set of predefined actions corresponding to the real-time motion of the at least one entity such that the set of predefined actions of the target element dynamically follow the real-time motion of the at least one entity in real time or substantially real time, wherein the dynamically rendering the at least one target element comprises rendering visual content including the motion of the virtual human character presented to the user by the head-mounted display (HMD) with which the user is associated such that the motion of the virtual human character dynamically follows the tactile sensory feedback provided to the user by the at least one entity according to the real-time motion thereof.

15. The system as claimed in claim 14, wherein the at least one entity comprises at least one of a sexual stimulation device of the user associated with the head-mounted display (HMD), and a sexual stimulation device of another user of the plurality of users.

16. The system as claimed in claim 14, the processes further comprising:

identifying a first entity among the at least one entity in the field view of the user based on the at least one item of preset information;

determining the at least one target element corresponding to the first entity;

determining, based on visual computing, a location coordinate of the first entity in the field of view of the user associated with the head-mounted display (HMD); and facilitating the head-mounted display (HMD) to render the at least one target element by superimposing the at least one target element on the first entity in the field of view of the user, the at least one target element being superimposed on the first entity in the field of view of the user based on the determined location coordinate of the first entity in the field of view of the user.

17. The system as claimed in claim 14, the processes further comprising:

identifying a second entity of the at least one entity in the field of view of the user based on the at least one item of preset information;

determining the at least one target element corresponding to the second entity;

determining, based on visual computing, a location coordinate of the second entity in the field of view of the user associated with the head-mounted display (HMD); and facilitating the head-mounted display (HMD) to render the at least one target element along with the second entity in the field of view of the user based on the determined location coordinate of the second entity in the field of view of the user.

18. The system as claimed in claim 14, the processes further comprising:

detecting at least one interaction input provided by the user to interact with the at least one entity and the at least one target element rendered in the field of view of the user by the head-mounted display (HMD), the at least one interaction input corresponding to the information related to the user defined in the plural items of preset information; and generating, by the processor, a control instruction corresponding to the at least one interaction input, the control instruction being configured to control at least one of (i) the at least one target element, (ii) a sexual stimulation device of a model user, and (iii) a sexual stimulation device of the user.

* * * * *